(12) United States Patent
Beaman

(10) Patent No.: US 7,793,055 B2
(45) Date of Patent: Sep. 7, 2010

(54) TRANSFERRING MEMORY BUFFERS BETWEEN MULTIPLE PROCESSING ENTITIES

(75) Inventor: Alexander B. Beaman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 572 days.

(21) Appl. No.: 11/499,040

(22) Filed: Aug. 4, 2006

(65) Prior Publication Data

US 2008/0034168 A1  Feb. 7, 2008

(51) Int. Cl.
 G06F 12/00  (2006.01)
(52) U.S. Cl. .................. 711/154; 711/173; 707/791
(58) Field of Classification Search ........... 711/154, 711/173; 707/791
 See application file for complete search history.

(56) References Cited

U.S. PATENT DOCUMENTS 5,265,250 A * 11/1993 Andrade et al. ........... 718/101
2002/0087710 A1 * 7/2002 Aiken et al. .............. 709/232
2003/0182330 A1 * 9/2003 Manley et al. ............ 707/205
2003/0188010 A1 * 10/2003 Raza et al. ............... 709/238
2006/0112115 A1 * 5/2006 Chan et al. ............... 707/100
2007/0136403 A1 * 6/2007 Kasuya .................... 707/206

* cited by examiner

*Primary Examiner*—Christian P Chace
*Assistant Examiner*—Hashem Farrokh
(74) *Attorney, Agent, or Firm*—Hickman Palermo Truong & Becker LLP; Daniel D. Ledesma

(57) ABSTRACT

Techniques for transferring data between multiple processing entities are described. A processing entity, such as a process or thread, transfers a first data structure to another processing entity. The first data structure represents a first amount of memory and references a second data structure of a similar type. The second data structure represents a second amount of memory. The second data structure contains a pointer to a block of memory. The second amount of memory includes at least a portion of the block of memory. The first amount of memory includes at least a portion of the block of memory. The transfer is performed without having to copy any portion of the block of memory.

42 Claims, 16 Drawing Sheets ns refer to other Blockbuffers.
TRANSFERRING MEMORY BUFFERS BETWEEN MULTIPLE PROCESSING ENTITIES

FIELD OF THE INVENTION

The present invention relates to communicating information within a computer system and, more specifically, to transferring blocks of memory between multiple processing entities, such as processes and threads.

BACKGROUND

The approaches described in this section are approaches that could be pursued, but not necessarily approaches that have been previously conceived or pursued. Therefore, unless otherwise indicated, it is not to be assumed that any of the approaches described in this section qualify as prior art, merely by virtue of their inclusion in this section.

Traditionally, when blocks of memory are transferred between processing entities (such as processes or threads), copies of at least a portion of the blocks of memory have to be performed. The transfer of memory blocks between processing entities frequently occurs in the context of a pipeline. A pipeline is a set of elements that operate, in series, on the same pieces of information, such that the output of one element of the pipeline serves as the input of the next element in the pipeline. The elements of a pipeline are often executed in parallel or in time-sliced fashion. An element of a pipeline may include one or multiple processing entities.

For example, consider a pipeline scenario in which a block, which contains both audio data and video data, is read from disk, modified, and eventually played back to a user. In the first stage, a first processing entity (e.g. a disk reader process) reads the block of data from disk into a contiguous block of volatile memory. In the second stage, a second processing entity (e.g. a parsing process) identifies the portion of the block of memory that corresponds to audio data and the portion of the block of memory that corresponds to video data. The second processing entity may then "split" the block of memory by creating a copy of the audio data and sending the copy of the audio data to a processing entity at a third stage (e.g. an audio processing process) that decompresses the copy of the audio data and acts as a demultiplexer to separate the audio data into its appropriate frequency components. The second processing entity may also create a copy of the video data and sends the copy of the video data to a different third stage processing entity (e.g. a video processing process) that decompresses the copy of the video data and demultiplexes the corresponding video signals.

Creating copies of blocks of memory is an expensive operation in terms of requiring significant computation time and requiring a significant amount of memory, especially when such copying is performed several times between many stages of a pipeline. Thus, there is a need to improve the performance of transferring blocks of memory from one processing entity to another.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
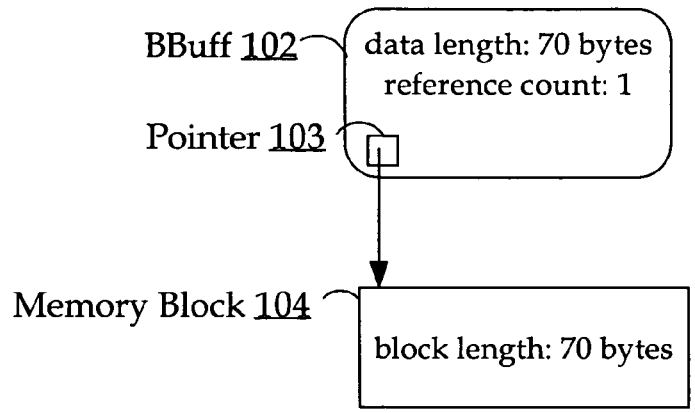
FIG. 1A is a block diagram that illustrates how a block of memory may be represented by a BlockBuffer, according to an embodiment of the invention.

The embodiments of the present invention described herein relate to a method for transferring buffering data structures between processing entities. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for transferring blocks of data among processing entities in a computing environment, such as in a pipeline.

A BlockBuffer is a data structure for representing memory. The memory represented by a BlockBuffer may be used to facilitate the movement of data through a processing system. In its simplest form, a BlockBuffer represents a block of memory of known size to which a client process may gain direct access. The memory represented by a BlockBuffer is identified by references contained within the Blockbuffer. Those references may include pointers to memory blocks, or references to other Blockbuffers.

BlockBuffers assist in simplifying the lifecycle management of the blocks of memory containing data as the blocks of memory are transferred between processing stages. In typical use, a client process may allocate memory using a Block-Buffer, store data in that memory, and hand off a BlockBuffer to a subsequent stage and not worry about the final disposal of the memory associated with the BlockBuffer. By invoking a BlockBuffer's methods, the processing entity (e.g., executed code) receiving the BlockBuffer "knows" how to access the data in the memory represented by the BlockBuffer without worrying about how that data was assembled nor how the underlying memory was allocated.

BlockBuffers permit implementation of a "gather" data access through the use of buffer references. Specifically, a Blockbuffer may be used to assemble multiple, non-contiguous memory regions into a single logical region of known size. Through the BlockBuffer, processing entities can directly access the individual memory portions. Similarly, a "scatter" data access is possible by creating additional Block-Buffers that refer to subsets of a larger BlockBuffer.

When the amount of memory represented by a Block-Buffer is increased, the Block "grows". A BlockBuffers may be "grown" by appending additional memory blocks or BlockBuffer references to the BlockBuffer. In one embodiment, BlockBuffers also support an attachment scheme by which arbitrary data is associated with a BlockBuffer by name.

Blockbuffer

A BlockBuffer or "BBuff" may be a data structure that represents an amount of memory. A BBuff stores information about the memory represented by the BBuff. That information includes pointers to actual memory blocks and/or references to other BBuffs. The memory blocks pointed to by a BBuff, and the other BBuffs referenced by a BBuff, are referred to collectively as the "memory sources" of the BBuff.

The memory blocks that serve as memory sources of a BBuff are referred to herein as the "child memory blocks" of the BBuff. The BBuffs that serve as memory sources for a BBuff are referred to herein as "child BBuffs" of the BBuff. A BBuff is referred to as a "parent BBuff" of its memory sources. The child BBuffs of a parent BBuff may themselves be parents to other child BBuffs and/or memory blocks.

The memory represented by a BBuff comes from the memory sources of the BBuff. In one embodiment, the memory represented by a BBuff includes at least a portion of the memory represented by each of the BBuff's memory sources. A BBuff includes methods that allow processing entities to index into and retrieve data from the memory sources of a BBuff as if the memory represented by the BBuff was a single logical memory block.

Single Child Memory Block Example

A simple BBuff is illustrated in FIG. 1A. Referring to FIG. 1A, it illustrates a BBuff 102 that represents (or "wraps") a single block of memory 104 that has a block length of 70 bytes. Memory block 104 may be any valid memory region of known size and should remain valid through the lifespan of BBuff 102.

In one embodiment, each BBuff maintains a value indicating an amount of memory represented by the BBuff. The amount of memory is based on the memory that the particular BBuff points to, directly and/or indirectly, from the BBuff's memory sources. Thus, a client may determine (e.g., by accessing a "data length" variable of BBuff 102) that BBuff 102 has a data length of 70. According to one embodiment, the BBuff also includes a method by which a client may obtain a pointer 104 to any byte within the logical memory block represented by BBuff 102, from offset 0 through 69.

Offsets into Memory Sources

In one embodiment, a particular BBuff maintains, for each of its memory sources, an offset value that indicates an offset. For child memory blocks, the offset is an offset into the memory block. For child BBuffs, the offset is an offset into the memory represented by the child BBuff.

The offset allows the particular BBuff to include less than all of the memory represented by a memory source. For example, if a parent BBuff has offset of 20 for a particular child BBuff, then the first 20 bytes of that child BBuff are not included in the memory represented by the parent BBuff. This allows each particular BBuff to represent only the data that the processing entity which created the particular BBuff is interested in.

In an alternative embodiment, BBuffs always include all of the memory of child memory blocks. Consequently, no offset need be maintained for the child memory blocks.

Lengths of Memory Sources

In one embodiment, each BBuff maintains, for each of its memory sources, a length value that indicates how much memory from the memory source is to be treated as part to the BBuff. For example, if a parent BBuff has offset of 20 and a length of 30 for a particular child BBuff, then only bytes 20 through 49 of the memory represented by child BBuff are considered part of the parent BBuff. Thus, the data length of a BBuff is the sum of the lengths maintained by the BBuff for all of the memory sources of the BBuff.

Multiple Child Memory Block Example

Figure 1B:
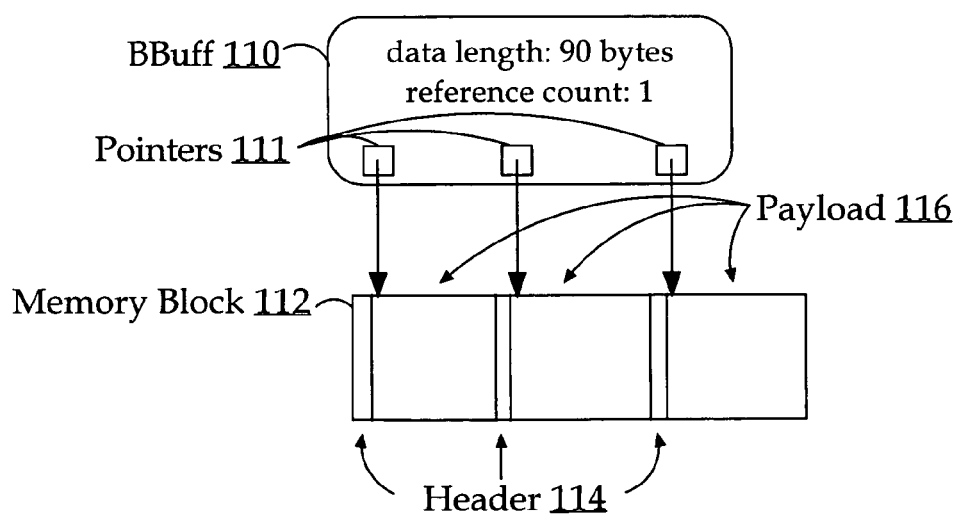
FIG. 1B is a block diagram that illustrates how a Block-Buffer may represent multiple noncontiguous blocks of memory as a single contiguous block of memory, according to an embodiment of the invention.

FIG. 1B illustrates a BBuff 110 that represents a logically contiguous block of memory (i.e., a memory block 112). Memory block 112 comprises multiple packets from a data stream, where each packet comprises a header 114 and a payload 116. Each header 114 is five bytes and each payload 116 is thirty bytes. BBuff 110 contains pointers 111 to the beginning of each payload 116. Alternatively, pointers 111 may point to the beginning of memory block 112 and have corresponding offsets to the appropriate memory location within memory block 112. Thus, under this approach, the first pointer 111 would have an offset of 5, the second pointer 111 would have an offset of 40, and the third pointer 111 would have an offset of 75.

The data length corresponding to each pointer is thirty bytes. Thus, the total data length of BBuff 110 is 90 bytes, whereas the block length of memory block 112 is 105 bytes.

Reference Counting

In one embodiment, referencing counting is employed by one or more BBuffs. Reference counting allows BBuffs to be passed throughout a processing system in which processing entities may obtain, use and release the BBuffs as needed. The ultimate disposal of a BBuff and its underlying memory is transparent to these processing entities. The child BBuffs also use reference counting, so that the each child BBuff may be transparently disposed when all of its parent BBuffs are disposed.

In one embodiment, the reference count of a BBuff increments for each processing entity that references the BBuff. Correspondingly, when a processing entity releases a BBuff, the reference count decrements.

Figure 2A:
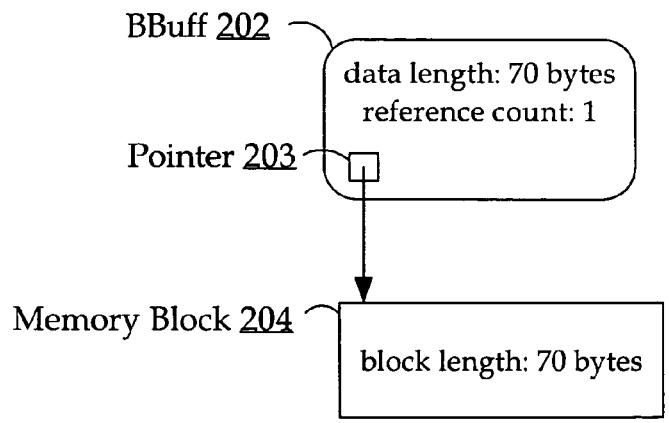
FIG. 2A-B are block diagrams that illustrate how the memory represented by a BlockBuffer may be a subset of the memory represented by another BlockBuffer, according to an embodiment of the invention.
Figure 2B:
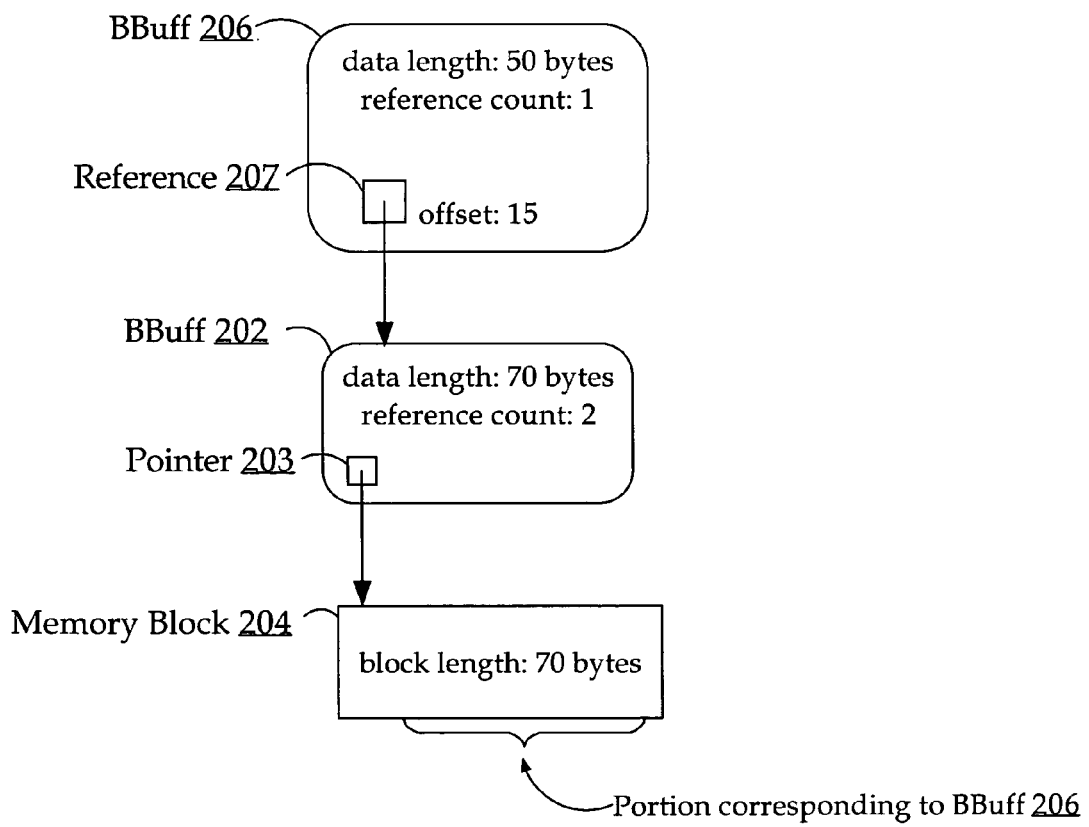

In one embodiment, when a BBuff creates references to one or more child BBuffs, the reference count of each of the one or more child BBuffs is incremented. For example, FIGS. 2A-B illustrates one situation in which the reference count of a BBuff may be modified. Initially, in FIG. 2A, a BBuff 202 represents 70 bytes of memory in a memory block 204. BBuff 202 contains a pointer 203 to memory block 204. In FIG. 2B, a BBuff 206 is created and a reference 207 is made to reference BBuff 202. The reference count of BBuff 202 increases from one to two. Also, the reference count of a particular BBuff is incremented for each processing entity (not shown) that is interested in (e.g. using) the particular BBuff.

Conversely, when a BBuff is disposed, and therefore no longer references a particular child BBuff, then the reference count of the particular child BBuff may be decremented. Also, when a particular BBuff is released by a process entity, then the reference count of the particular BBuff is decremented.

If the reference count of the particular BBuff is zero (indicating that no other BBuff references the particular BBuff, and no processing entity is using the BBuff), then the particular BBuff may be disposed or deleted. As part of the disposal process, any memory blocks to which the particular BBuff refers and for which there is an associated allocator, may be deallocated. Also, any child BBuffs of the particular BBuff are released (causing them to decrement their respective reference counts).

For example, suppose the processing entity using BBuff 206 releases BBuff 206. The reference count of BBuff 206 would decrease from one to zero and BBuff 206 may then be disposed. Also, the reference count of BBuff 202 would decrease from two to one. As another example, suppose the processing entity using BBuff 202 releases BBuff 202 while BBuff 206 contains a reference to BBuff 202. The reference count of BBuff 202 would decrease from two to one. BBuff 202 would not be disposed because BBuff 202 would still have a positive number. If BBuff 202 is disposed with BBuff 206 still referencing BBuff 202, then BBuff 206 would lose access to memory block 204.

In a different embodiment, a new BBuff that references one or more other BBuffs triggers the reference count of each of the one or more other BBuffs to increment, along with the reference counts of each of the BBuffs referenced directly and indirectly by the one or more other BBuffs. Conversely, when a particular BBuff is disposed, the reference count of each of the one or more other BBuffs that the particular BBuff references directly or indirectly decrements.

A reason why processing entities do not need to know how memory is allocated and deallocated is because the code that is executed for performing those functions are part of a BBuff object itself. For example, a processing entity must simply know how to call the release function on a BBuff for disposing memory represented by the BBuff. Execution of the release function causes the reference count of the BBuff to decrement. If the reference count is zero, then each the release function is called for each child BBuff of the BBuff. If the BBuff points to a memory block, then the BBuff itself deallocates the memory block.

Attachments

A BBuff may be configured to support the attachment of ancillary data for, for example, annotation and identification. These attachments may be maintained within a BBuff's structure and may be referenced by name. In one embodiment, the names of the attachments of a BBuff are unique relative to each other. Attachments may be released when the BBuff is disposed. Attachments may be used to tag the BBuff with information about its origin (e.g. file name, offset, reading time), or various aspects of its processing progress (e.g. completion flags, or metadata). Thus, attachments may travel with a BBuff through multiple stages of a processing system.

Subsetting

According to an embodiment, a particular BBuff may represent a particular logically contiguous block of memory, where the logically contiguous block of memory resides within another logically contiguous block of memory referenced by another BBuff. The other logically contiguous block of memory itself may be a single block of memory, multiple blocks of memory, or yet another logically contiguous block of memory.

For example, FIGS. 2A-B are block diagrams that illustrate how the memory represented by a BBuff may be a subset of the memory represented by another BBuff, according to an embodiment of the invention. In FIG. 2B, a portion of the data length of BBuff 202 becomes at least a part of a logically contiguous memory block represented by new BBuff 206. This subset is specified using an offset and data length. BBuff 202 still manages all 70 bytes of memory block 204. BBuff 206 contains reference 207 that references BBuff 202 and subscribes to a subset of 50 bytes starting at offset 15. A client may determine that BBuff 206 has a data length of 50 bytes and can address its bytes at offsets 0 to 49, while the actual memory comes from offsets 15 to 64 in memory block 204 managed by BBuff 202.

Operations Using Blockbuffers

Some of the various operations that BBuffs support include creating a BBuff, appending memory sources (i.e., BBuffs and/or memory blocks) to a BBuff, obtaining a pointer or reference to child memory sources of a BBuff to access the memory represented by the BBuff, setting and obtaining attributes of a BBuff, copying any portion of the memory represented by a BBuff, assuring that a deferred memory allocation has been performed, determining whether a BBuff is empty and whether the memory represented by the BBuff is actually contiguous.

Appending Memory Sources to a Blockbuffer

A processing entity may acquire pointers into the memory represented by a BBuff (e.g., using the BBuffGetDataPointer ( ) function). Any change in the memory represented by the BBuff must be done in a manner that would not invalidate any of the pointers that the BBuff has previously provided to processing entities.

For example, a first processing entity expects to obtain the first 100 bytes represented by BBuff A. If a memory source is added to BBuff A such that BBuff A represents the memory source logically before the 100 bytes required by the first processing entity, then the first processing entity will not obtain the 100 bytes it expected. Thus, new memory sources (memory blocks or BBuff references) are always appended to a BBuff, and existing memory sources are never reduced in size, or re-ordered. If a client has obtained a pointer within a BBuff (while holding a reference to the BBuff) and that BBuff is later extended, the client's pointer reference is still valid.

Thus, according to one embodiment, a second BBuff may be added as a memory source to a first BBuff by adding a reference to the second BBuff to the first BBuff. Once the reference to the second BBuff is added, an amount of memory represented by the first BBuff increases. The amount of increase is equal to the amount of memory indicated by the length value maintained by the first BBuff for the second BBuff (which may be less than all of the memory actually represented by the second BBuff). Thus, the data length of the first BBuff increments to reflect that the amount of memory represented by the first BBuff includes at least a portion of the memory represented by the second BBuff.

Also, according to one embodiment, a pointer to a block of memory may be added to a first BBuff that already contains a reference to another BBuff and/or a pointer to another block of memory. The amount of increase is equal to the amount of memory indicated by the length value maintained by the first BBuff for the new child memory block. Accordingly, the amount of memory represented by the first BBuff increases. Thus, the data length of the first BBuff increments to reflect that the amount of memory represented by the first BBuff includes at least a portion of the added block of memory.

Figure 3A:
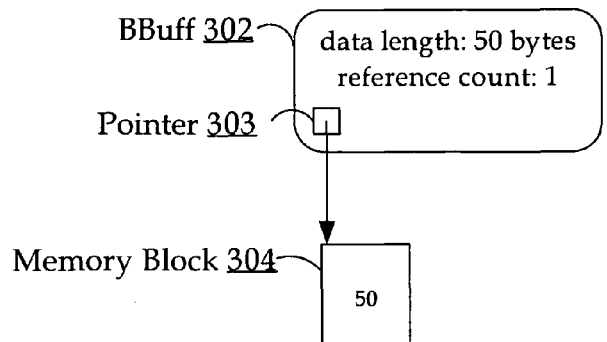
FIGS. 3A-C are block diagrams that illustrate how memory may be appended to a BlockBuffer, according to an embodiment of the invention.
Figure 3B:
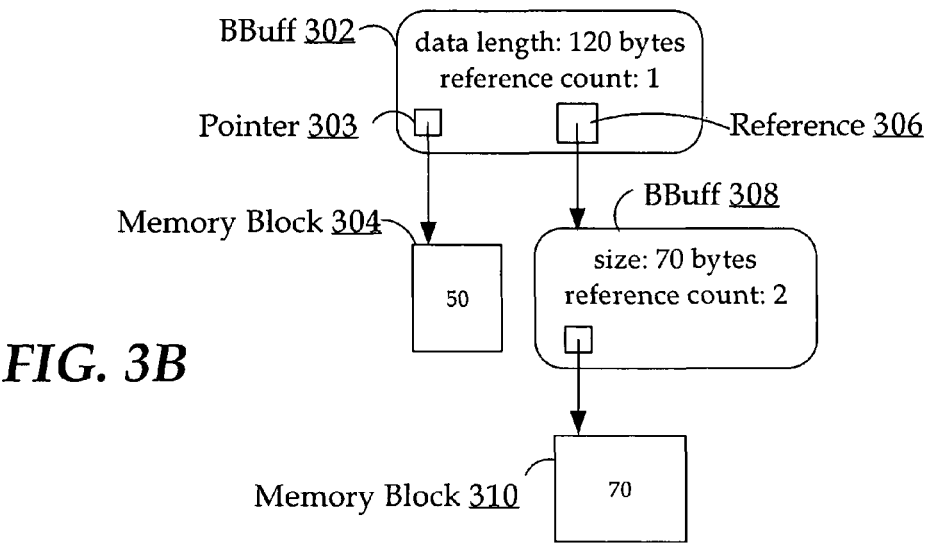
Figure 3C:
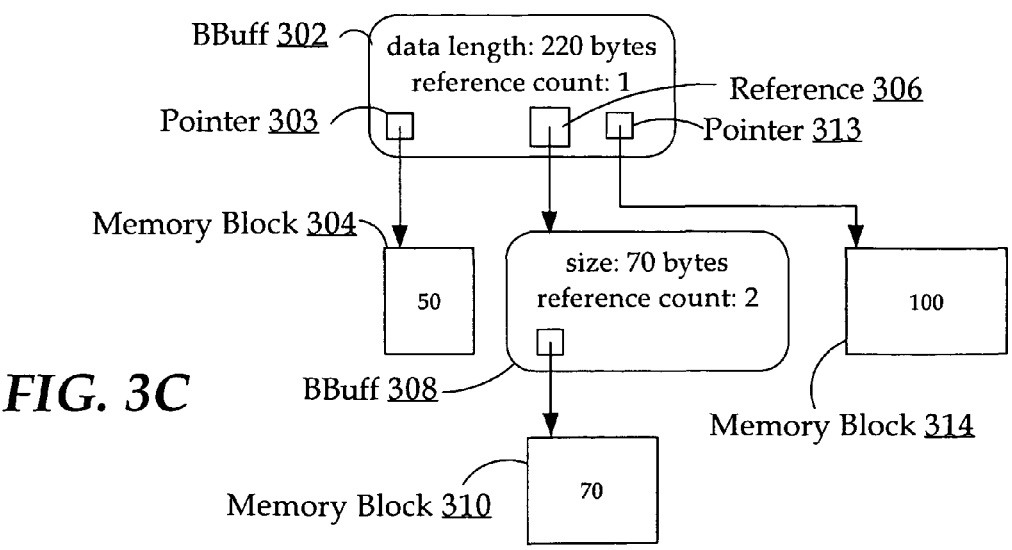

FIGS. 3A-C are block diagrams that illustrate how memory may be appended to a BBuff, according to an embodiment of the invention. In FIG. 3A, a BBuff 302 contains a pointer 303 to a memory block 304. The data length of BBuff 302 is 50 bytes. In FIG. 3B, a BBuff 308 is appended to BBuff 302. In response to creating the reference 306 in BBuff 302 to reference BBuff 308, the reference count of BBuff 308 is incremented.

BBuff 308 contains a pointer to a memory block 310, which is 70 bytes in length. At the time illustrated in FIG. 3B, memory block 310 is the only memory source for BBuff 308. Consequently, BBuff 308 represents 70 bytes. If BBuff 302 requires all the data at memory block 310, then the data length of BBuff 302 is change to 120 bytes. In addition, the offset of 0, and the length of 70, are stored in BBuff 302 in association with the reference 306 to BBuff 308.

In FIG. 3C, a memory block 314 is appended to BBuff 302. A pointer 313 is directed to point to memory block 314, which is 100 bytes in length. If BBuff 302 requires all the data at memory block 310, then the data length of BBuff 302 changes from 120 to 220 bytes. In addition, the length 100 of memory block 314 is stored in BBuff 302 in association with memory block 314.

Merging Contiguous Memory Sources

In some cases, when a child BBuff is appended to a particular BBuff, the memory represented by the child BBuff may be contiguous with the "last" memory represented by the particular BBuff, where the "last" memory is also represented by a "last" child BBuff of the particular BBuff. Therefore, in one embodiment, instead of appending a new child BBuff to represent the appended memory, the data length maintained in the "last" child BBuff is increased to reflect the amount of the appended memory, along with the data length of the particular BBuff.

Figure 3D:
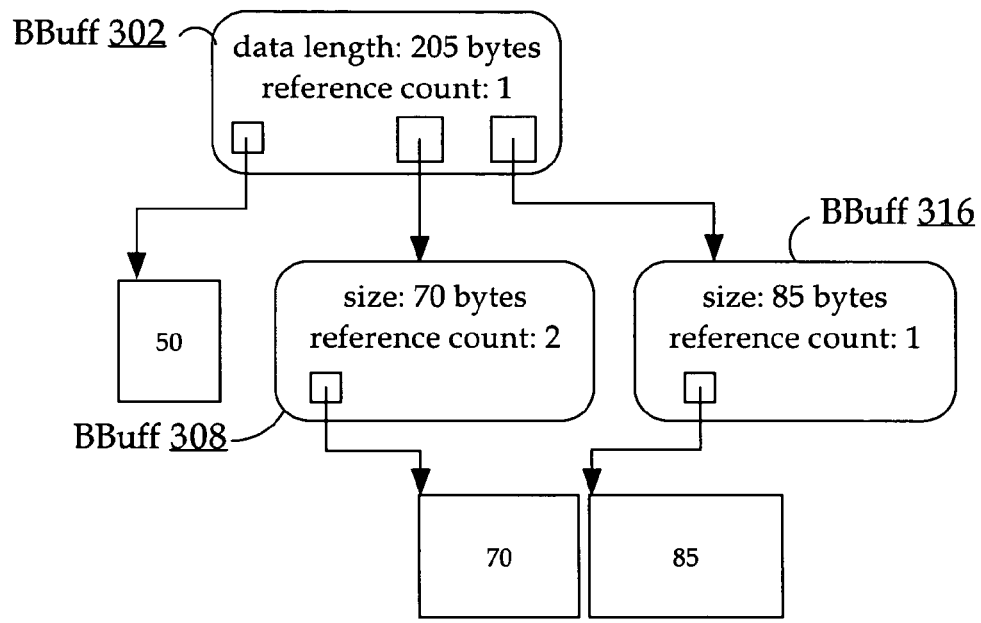
FIGS. 3D-E are block diagrams that illustrates how contiguous BBuffs may be merged, according to an embodiment of the invention.
Figure 3E:
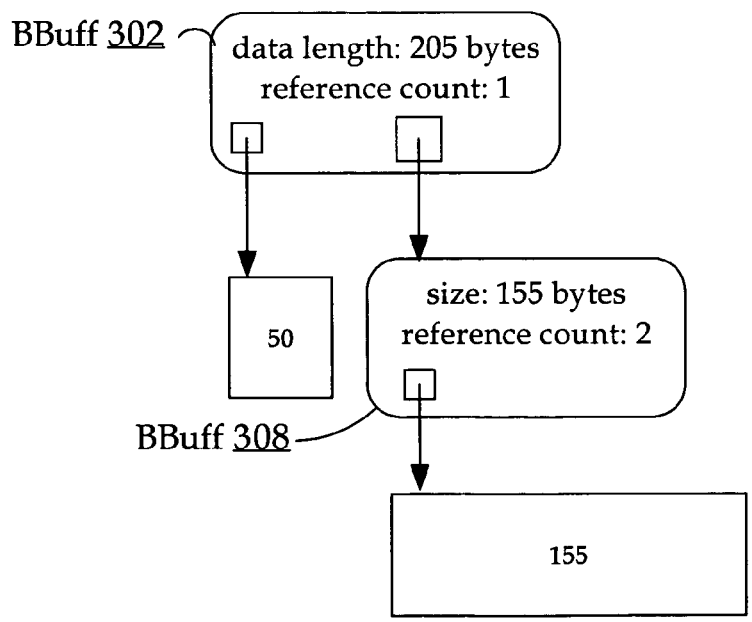

FIGS. 3D-E are block diagrams that illustrate how contiguous BBuffs may be merged, according to an embodiment of the invention. Suppose 85 bytes of memory represented by BBuff 316 is to be added to BBuff 302 of FIG. 3B. A straightforward append operation would cause a second reference of BBuff 302 to reference BBuff 316. Further suppose that it is determined that the 85 bytes of memory represented by BBuff 316 is contiguous with the last memory represented by BBuff 302, where the last memory is represented by a child (or other "descendant") BBuff of BBuff 302, which child BBuff is BBuff 308 in this example. Instead of causing a second reference of BBuff 302 to reference BBuff 316 (as FIG. 3D illustrates), the size of BBuff 308 increases by 85, indicating that BBuff 308 now represents 155 bytes of memory.

This process is useful because some processing entities require a single contiguous block of memory, which, in the case of discontiguous blocks of memory, would require a copy operation. Therefore, by recognizing that appended BBuffs may be contiguous with a child BBuff of a BBuff and appending according to the above description, the BBuff may be in condition for use by such processing entities, thereby avoiding a copy operation.

Depth Reduction Optimization

Situations may arise when a first BBuff requires a small portion of the memory represented by a particular child BBuff where child BBuffs of the particular child BBuff are only kept "alive" because of the first BBuff. In other words, the reference from the first BBuff to the particular child BBuff is keeping the child BBuffs from being deleted. Thus, a significant amount of memory may be held up and not utilized for other purposes.

Figure 4A:
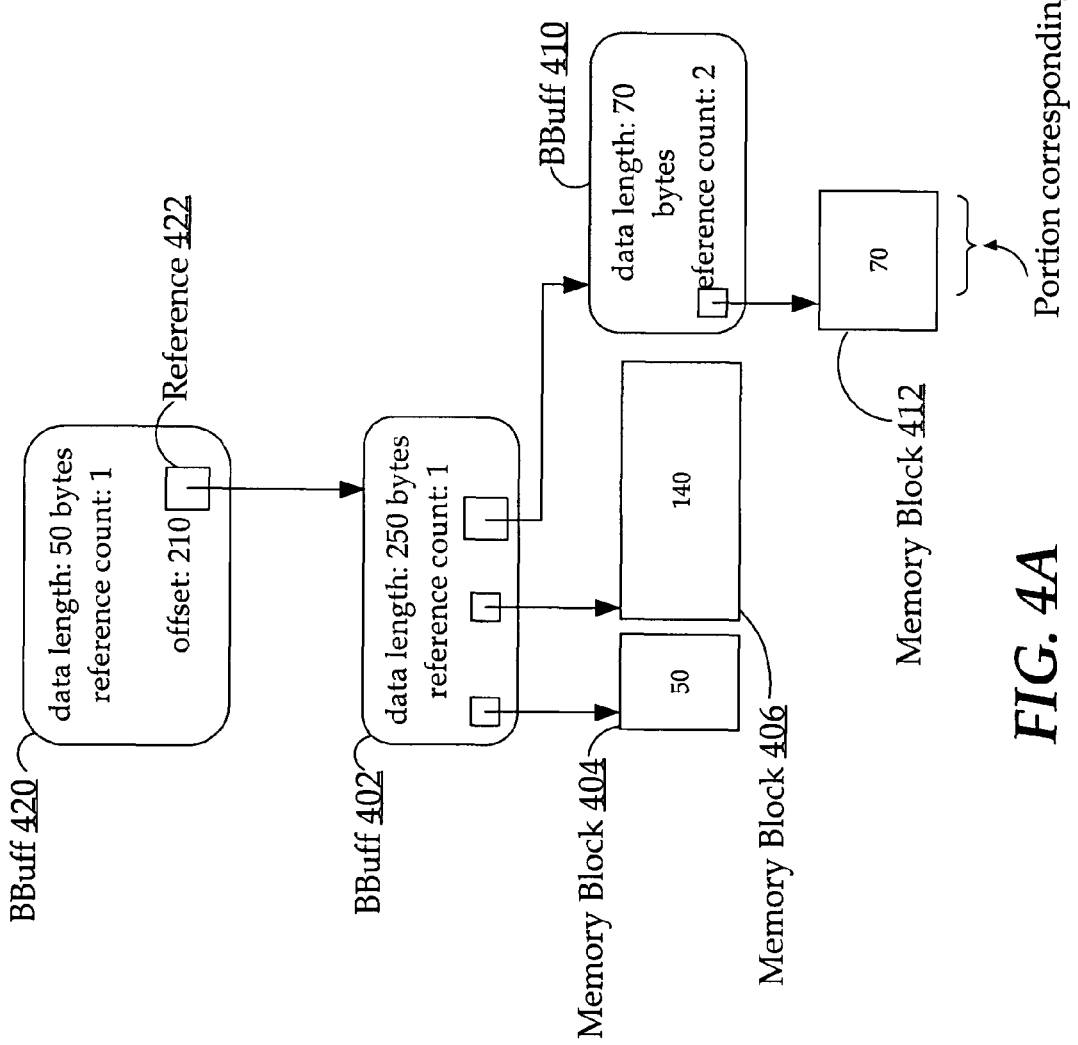
FIGS. 4A-C are block diagrams that illustrate a depth reduction technique, according to an embodiment of the invention.

For example, FIG. 4A illustrates a situation where the processing entity that was using a BBuff 402 is no longer interested in the memory managed thereby (i.e. a memory block 404, a memory block 406, and 60 bytes of a memory block 412, to which a BBuff 410 points). The reference count of BBuff 402 is one, because a BBuff 420 contains a reference 422 to BBuff 402. This indicates that BBuff 402 is "alive" only because BBuff 420 is referencing BBuff 402. However, no processing entity is interested in the data at memory block 404 or memory block 406 and BBuff 420 represents memory only in memory block 412. Therefore, at least 190 bytes of memory could be freed up for use by other processing entities.

Figure 4B:
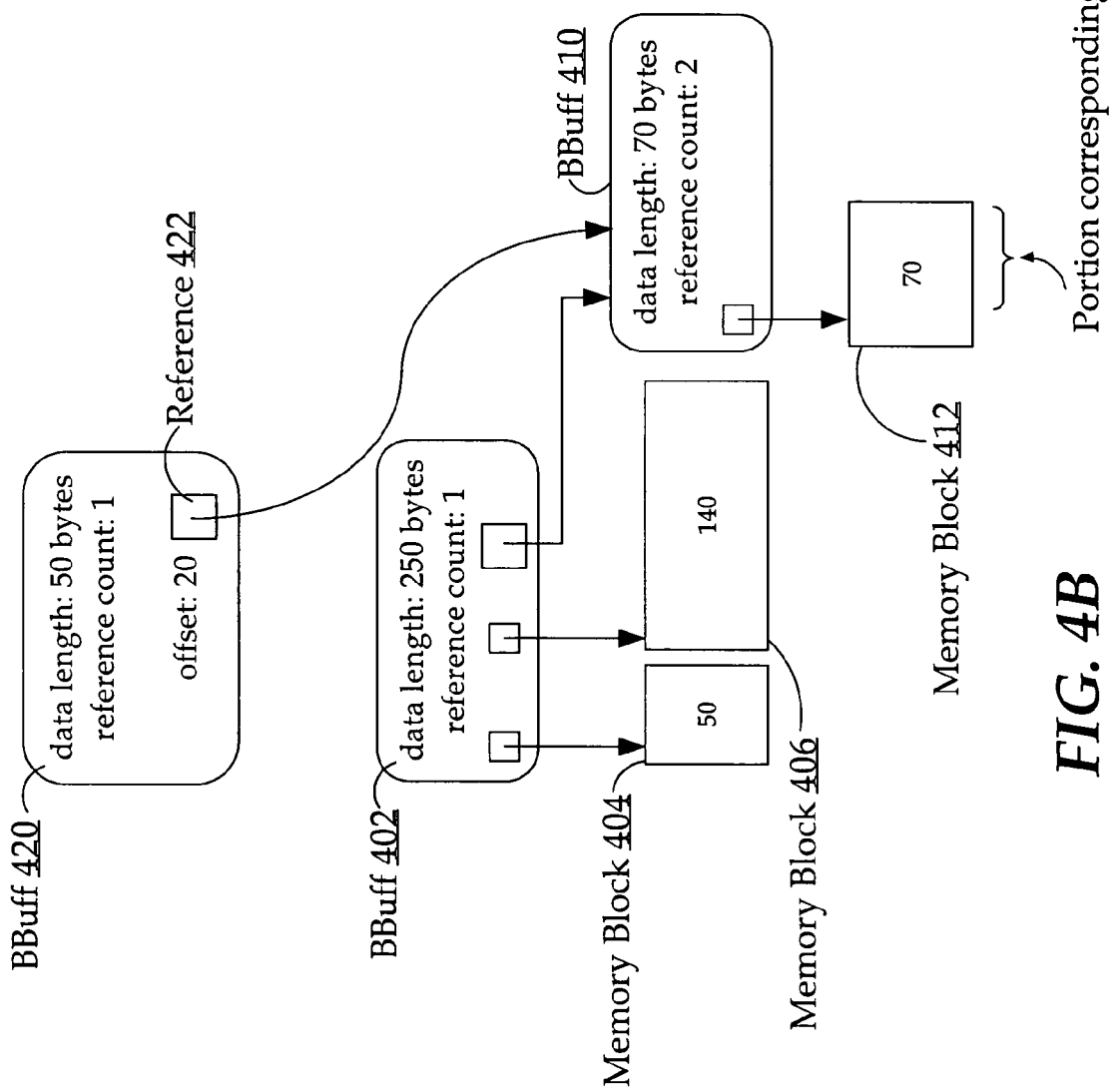
Figure 4C:
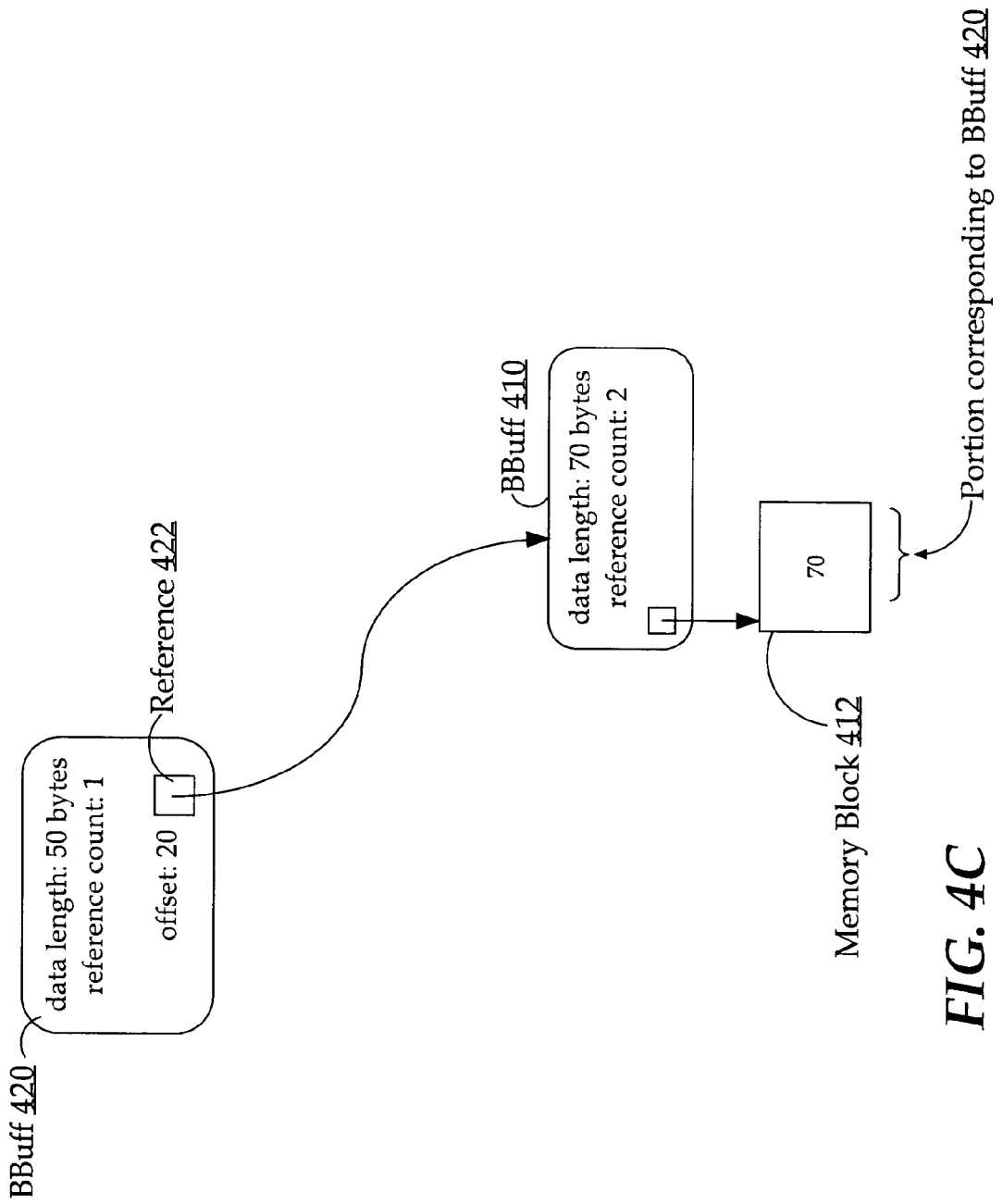

Once this situation is detected, reference 422 may be redirected to reference BBuff 410 directly (see FIG. 4B). The offset of BBuff 420 changes from 210 to 20 because 190 bytes of memory (from memory blocks 404 and 406) are no longer referenced indirectly by BBuff 420. The reference count of BBuff 402 decrements from one to zero, indicating the BBuff 402 may be disposed and the memory represented thereby may be deallocated and freed for other processing purposes. FIG. 4C illustrates this final state once BBuff 420 references BBuff 410 directly.

One benefit of depth reduction optimization is that blocks of memory that are being referenced by a BBuff but are no longer being used may be freed up for use by other processing entities.

Another benefit of depth reduction optimization is that one or more levels of indirection are avoided. Specifically, at least one less dereferencing operation needs to be performed. Such depth reduction optimization need not be limited to the context above. Rather, depth reduction may be automatically performed whenever:

BBuff X references BBuff Y;

BBuff Y references BBuff Z; and

The only memory from BBuff Y used by BBuff X is memory from BBuff Z.

Under these circumstances, depth reduction is performed by changing BBuff X to refer directly to BBuff Z, rather than to BBuff Y.

Figure 5A:
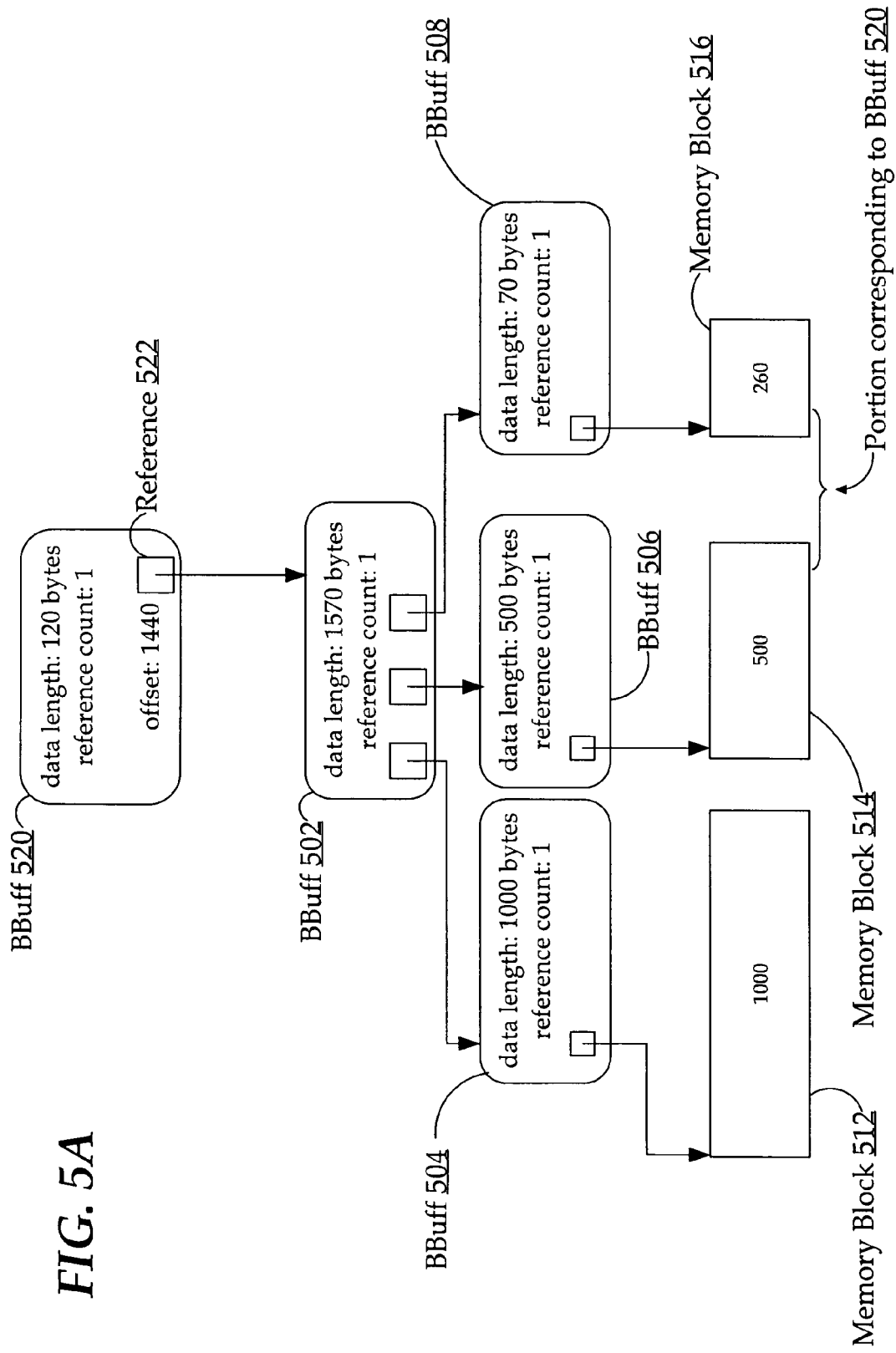
FIGS. 5A-C are block diagrams that illustrate a related depth reduction technique, according to an embodiment of the invention.
Figure 5B:
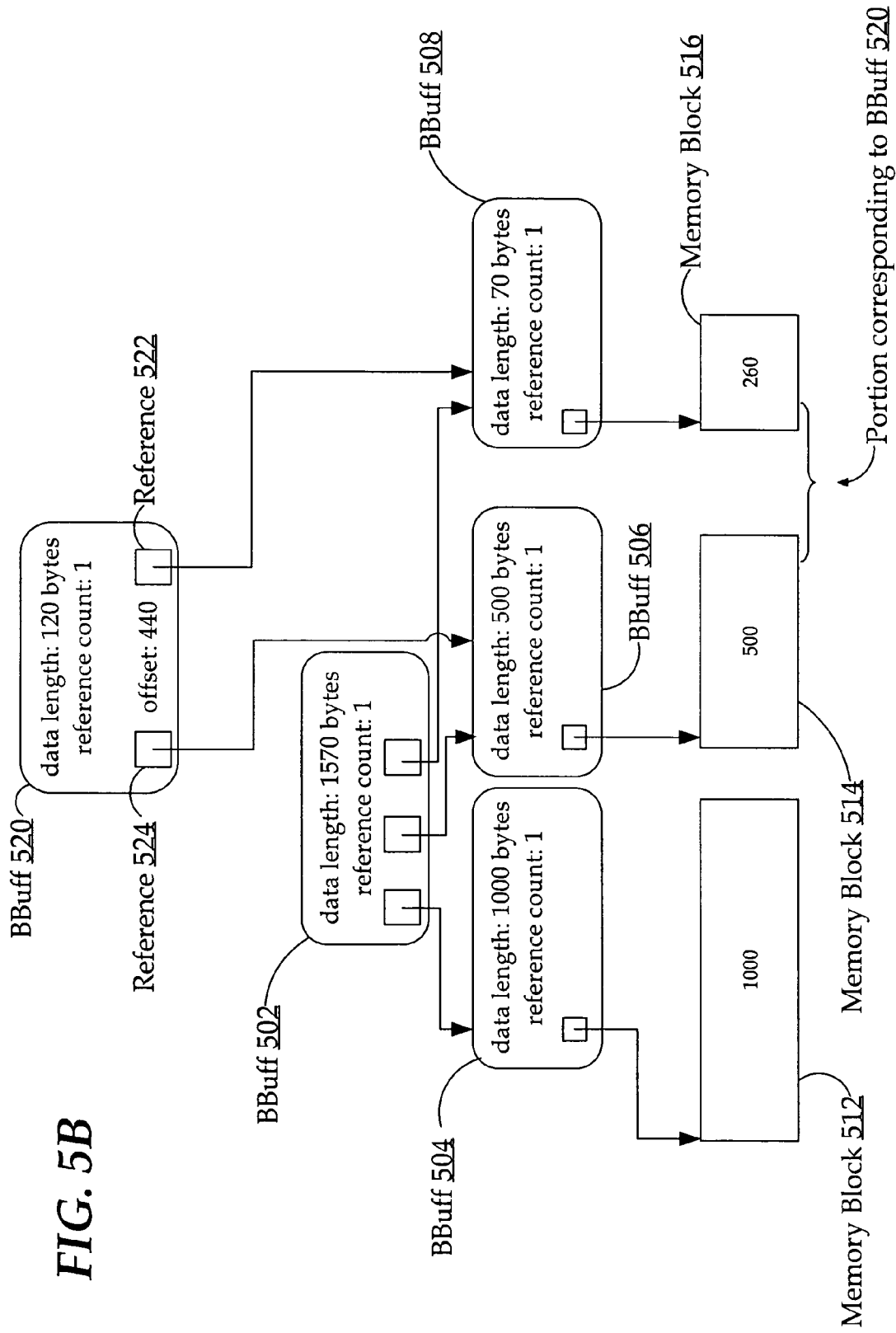
Figure 5C:
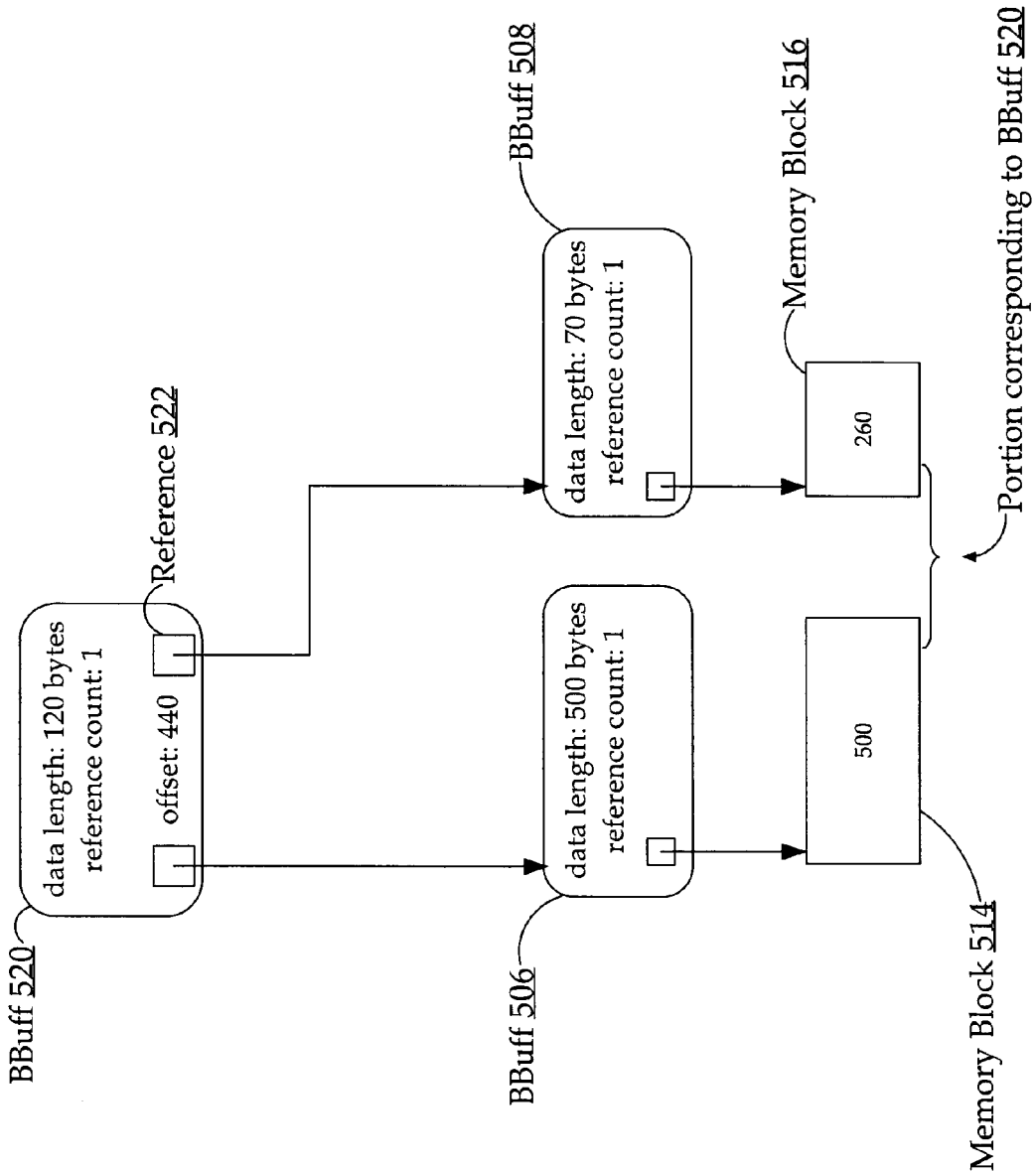

FIGS. 5A-C are block diagrams that illustrate a similar situation to the one described above. In FIG. 5A, a BBuff 520 represents an amount of memory that spans multiple BBuffs (i.e. BBuff 506 and BBuff 508). BBuff 520 contains a reference 522 to a BBuff 502, which contains references to a BBuff 504 and BBuffs 506 and 508. BBuff 504 contains a pointer to a memory block 512. BBuff 506 contains a pointer to a memory block 514. BBuff 508 contains a pointer to a memory block 516.

When this (or a similar) situation is discovered, reference 522 is modified (see FIG. 5B) by referencing one of the BBuffs that represent an amount of memory represented by BBuff 520 (e.g., BBuff 508) instead of BBuff 502. Also, a reference 524 is added to BBuff 520 to reference the other BBuff that represents an amount of memory represented by BBuff 520 (e.g. BBuff 506). Another number of references may be added to BBuff 520, depending on the number of BBuffs that represent memory represented by BBuff 520.

Also, the offset of BBuff 520 is decreased by 1000 (see FIG. 5B), which represents an amount of memory that BBuff 502 represented but that is no longer accessible to BBuff 520.

The reference counts of BBuffs 502 and 504 may be decremented from one to zero, indicating that no processing entity requires the data in memory block 512. Therefore, memory block 512 may be freed for other processing purposes. FIG. 5C illustrates a final state of deleting BBuffs 502 and 504 and deallocating memory block 512.

A Promise for Memory

A BBuff may manage various types of memory regions. Memory regions may be fixed, pre-allocated regions that are "wrapped" by a BBuff, such as have been described above. Such regions may optionally be freed when the BBuff is finally disposed.

However, a BBuff may also be built for memory that has not yet been allocated. Allocation of such memory may be deferred to some later time, but the BBuff may still participate in nested references while still "reporting" the promised size of the memory. In many situations, a processing entity "knows" how much memory is required but the memory is not required for a certain period of time. By deferring allocation of the memory until later, memory is not consumed until the data is absolutely required by the processing entity.

As an example of supplying a BBuff that does not yet have memory, suppose a client requests 1000 bytes to be read from a file one minute from now. A new BBuff is created where its data length indicates 1000 bytes. Essentially, the new BBuff "wraps" a memory block that does not exist yet. One minute later, the client requests the memory to be allocated (e.g., by a reading process). The client may then read any of the 1000 bytes using the new BBuff.

Empty Blockbuffer

A situation that is similar to a promise for memory discussed above is the creation of an "empty" BBuff. An empty BBuff is one which has no memory or references associated with it, and which reports zero for its data length. An empty BBuff is useful for passing to an API that will add to the BBuff using append operations, such as those discussed above (where one would have passed an empty handle without this embodiment). Also, it may be desirable to create the BBuff structure using a particular allocator or to have attachments (discussed above) attached to a BBuff before its underlying data shows up.

Therefore, there are at least three approaches to satisfy a generic request for N bytes at offset M from file Q. According to the first discussed approach, a BBuff is created with the N bytes of memory already allocated for the BBuff. According to the second discussed approach, a BBuff is created with the N bytes of memory that will be allocated in the future (i.e., "promise for memory"). Under both approaches, a memory block is allocated for the newly created BBuff and N bytes are copied from file Q into the memory block. Thus, data sharing between file Q and the BBuff is not possible without copy operations. However, according to the empty BBuff approach, an empty BBuff is created and the N bytes of memory is later appended to the empty BBuff by causing a reference of the empty BBuff to reference another BBuff containing cached bytes previously read from file Q. This allows other small references to portions of the same cached region of the file to refer to the same BBuff, achieving the copy savings. Also, the cached portions of the file might span multiple cache BBuffs, so a request may be fulfilled by appending multiple references to the empty BBuff.

Expansion Blockbuffer

According to one embodiment, a BBuff is limited to a certain number of pointers and/or references. To accommodate additional pointers to blocks of memory and/or additional references to other BBuffs, the BBuff's structure may need to grow. This expansion is done in terms of memory sources, a memory source being either a memory block or a BBuff reference. A BBuff may be configured to accommodate a default number of memory sources. However, this number may be controlled in BBuff creation APIs. If a client expects to do a large number of append operations, a BBuff may be created with a larger initial memory source capacity. This accommodation helps the BBuff code to size its structures appropriately with the goal of minimizing overhead. Generally, a client need not worry about a specific memory source capacity. For example, passing zero to a BBuff creation API may cause the new BBuff to be configured to reference or point to a default number of memory sources.

Figure 6A:
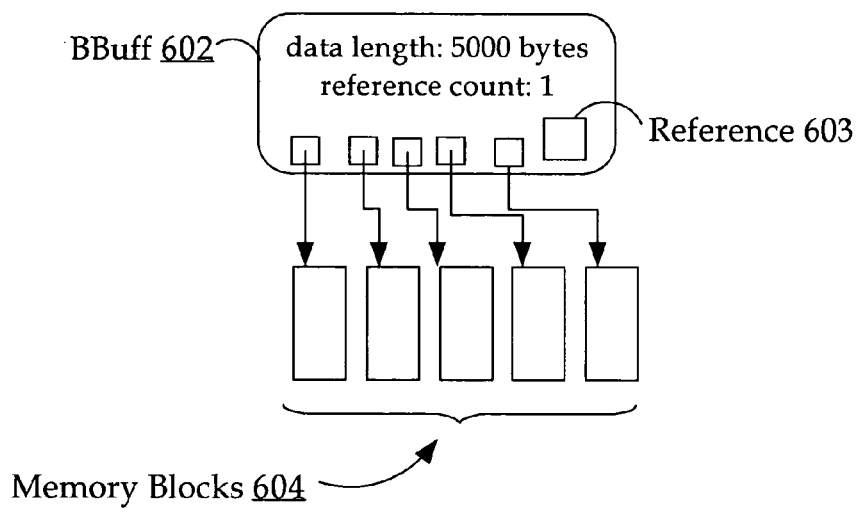
FIGS. 6A-B are block diagrams that illustrate a use of an expansion Blockbuffer, according to an embodiment of the invention.
Figure 6B:
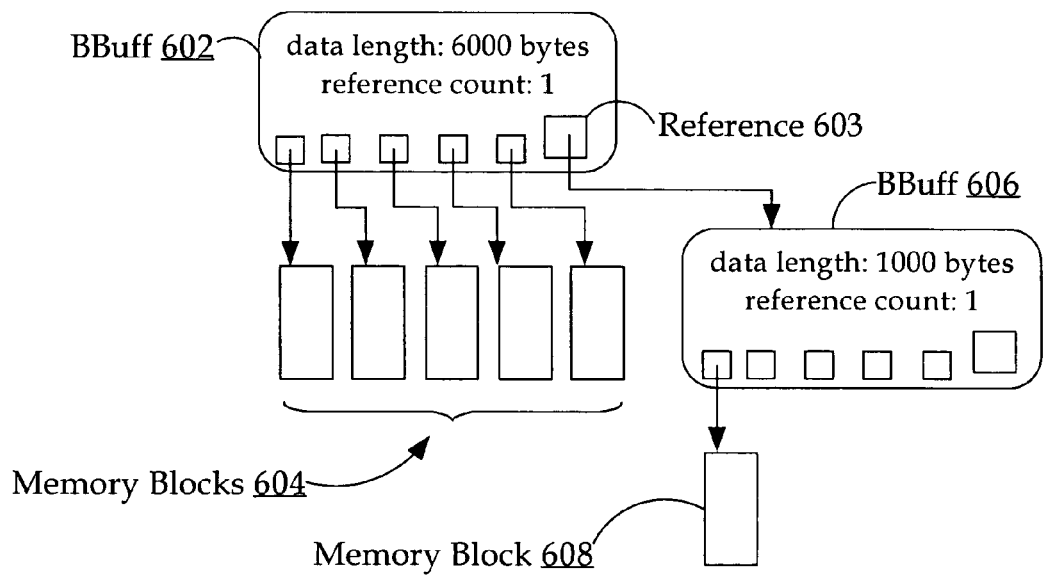

FIGS. 6A-B are block diagrams that illustrate a use of an expansion Blockbuffer, according to an embodiment of the invention. BBuff 602 contains five pointers and a reference 603. In FIG. 6A, each pointer in BBuff 602 points to a particular block of memory of memory blocks 604. In FIG. 6B, when a memory block 608 is to be appended to BBuff 602, instead of adding another pointer to BBuff 602, a new BBuff 606 (an expansion BBuff) is created and reference 603 is directed to reference BBuff 606. A pointer in BBuff 606 is directed to point to memory block 608. The data length of BBuff 602 changes to reflect the amount of memory represented by BBuff 606.

Pipeline Example

Figure 7A:
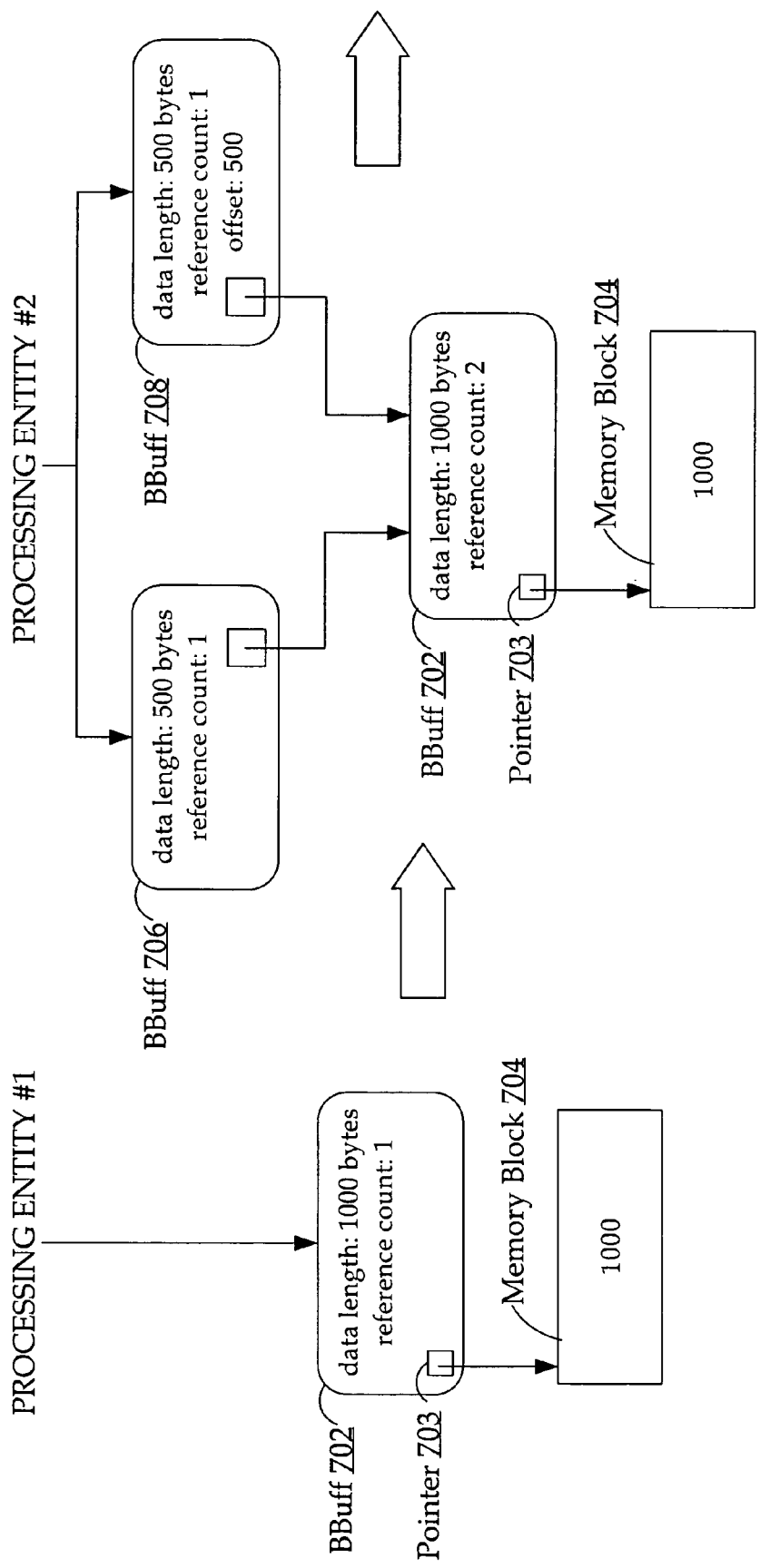
FIGS. 7A-D are block diagram that illustrate how processing entities in a pipeline transfer BlockBuffers, according to an embodiment of the invention.

FIG. 7A-D are block diagrams that illustrates how processing entities in a pipeline may transfer BlockBuffers, according to an embodiment of the invention. In FIG. 7A, processing entity #1 may be a reading process that reads data from a file for a first stage in the pipeline. Processing entity #1 creates a BBuff 702 with a pointer 703 for pointing to an allocated memory block 704. The length of data represented by BBuff 702 is 1000 bytes and the offset into memory block 704 is 0. Because BBuff 702 is referenced by a processing entity, the reference count of BBuff 702 is 1.

Processing entity #1 then transfers BBuff 702 to processing entity #2 for a second stage in the pipeline. The reference count of BBuff 702 is still 1 because at least one processing entity is referencing BBuff 702. Processing entity #2 analyzes memory block 704 and determines which portion is to be processed by processing entity #3 in the pipeline and which portion is to be processed by processing entity #4 in the pipeline.

After the determination, processing entity #2 creates a BBuff 706 for representing the first 500 bytes of memory block 704 and causes a reference of BBuff 706 to reference BBuff 702. Thus, the data length of BBuff 706 is 500 and the offset is 0. Processing entity #2 also creates a BBuff 708 for representing the second 500 bytes of memory block 704 and causes a reference of BBuff 708 to reference BBuff 702. Thus, the data length of BBuff 708 is 500 and the offset is 500.

Figure 7B:
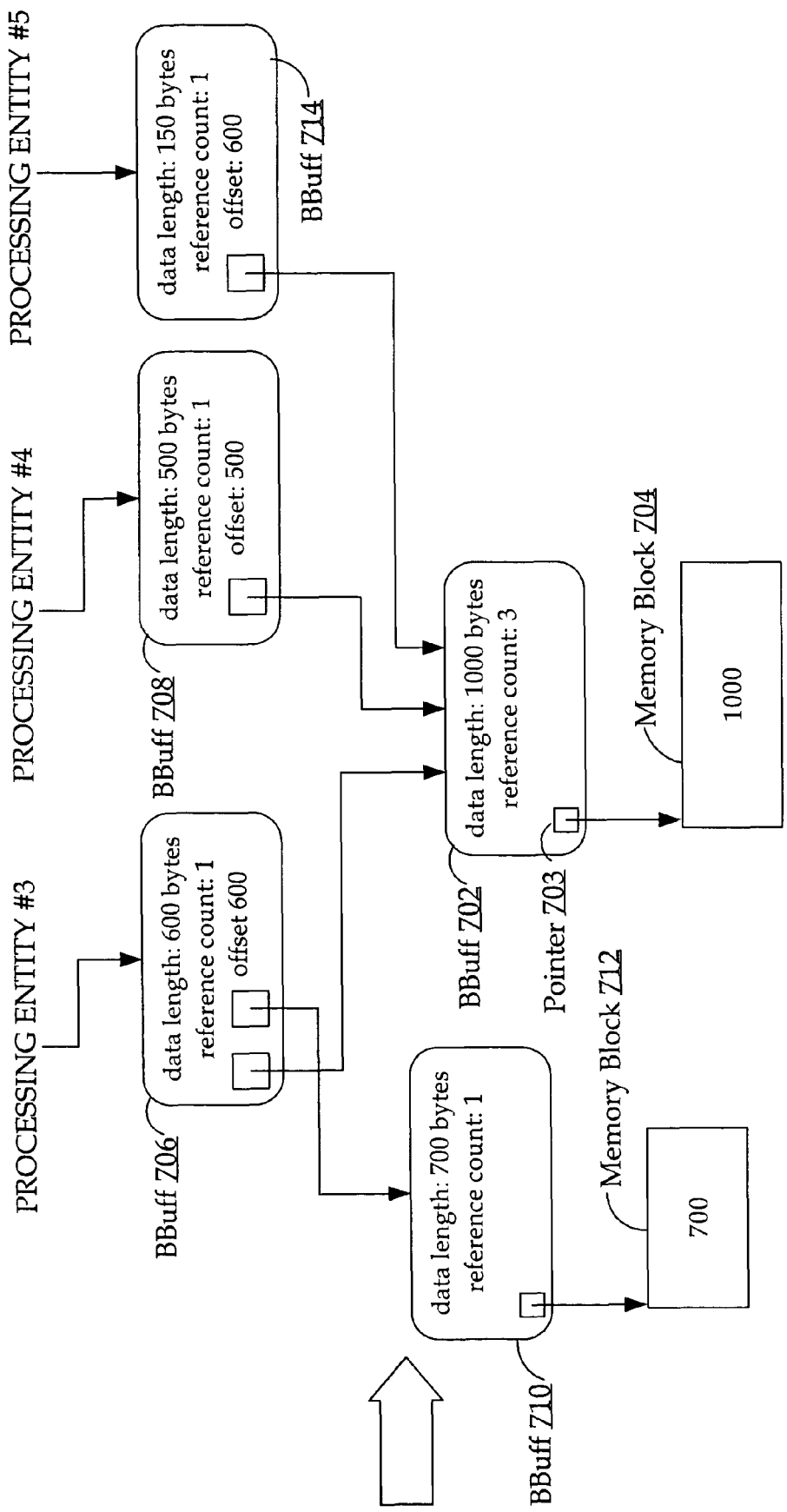

Processing entity #2 then transfers BBuffs 706 and 708 to processing entities #3 and #4, respectively, for a third stage in the pipeline (see FIG. 7B). Processing entity #3 appends 100 bytes of memory to BBuff 706 by causing a second reference of BBuff 706 to reference BBuff 710, which has a pointer to a memory block 712. Processing entity #3 is only interested in the last 100 bytes of the memory represented by BBuff 710. Therefore, the offset associated with the second reference of BBuff 706 is 600. The data length of BBuff 706 increases from 500 bytes to 600 bytes. The reference count of BBuff 710 indicates that only one processing entity (i.e., processing entity #3 through BBuff 706) is interested in at least a portion of the memory represented thereby.

Continuing in the third stage, processing entity #5 is interested in 150 bytes of the memory represented by BBuff 708 beginning at offset 100 bytes into the memory represented thereby. Thus, processing entity #5 creates a BBuff 714 with a data length of 150. However, it is determined that the memory represented BBuff 714 is entirely within one reference of BBuff 708 (i.e. BBuff 702). Therefore, the reference of BBuff 714 references BBuff 702 directly. The offset associated with the reference of BBuff 714 is 600 because the offset of BBuff 708 is 500 (100+500=600). Because another BBuff references BBuff 702, the reference count of BBuff 702 increments to 3.

Figure 7C:
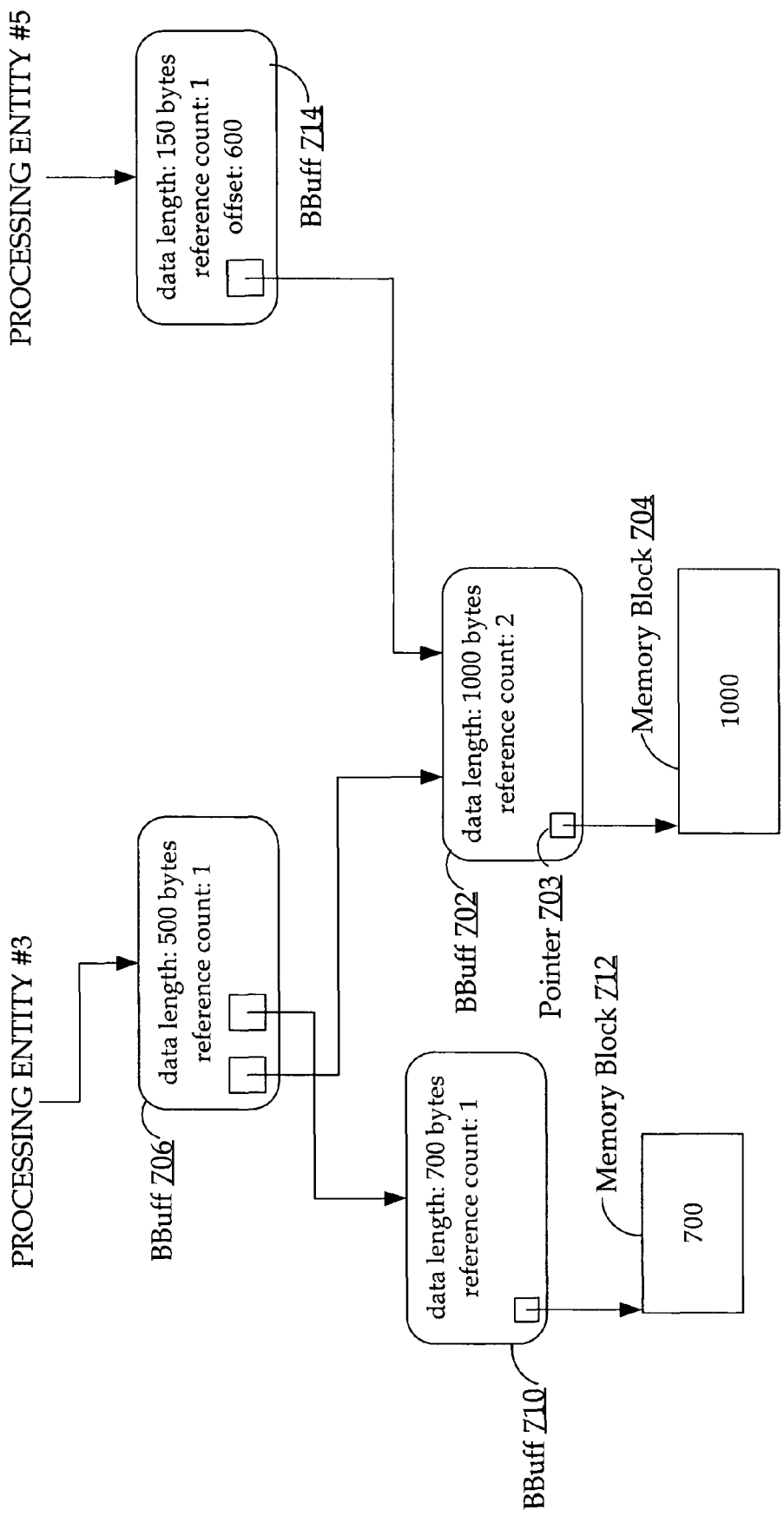

FIG. 7C illustrates the result of processing entity #4 releasing BBuff 708. Before processing entity #4 terminates, it calls the release function on BBuff 708. As a result, the reference count of BBuff 708 decrements from one to zero. Because the reference count decrements from one to zero, BBuff 708 releases all the memory sources it directly references. In this example, Buff 708 only has a single reference to BBuff 702 (see FIG. 7B) and calls the release function. The reference count of BBuff 702 decrements from three to two and no other memory source is released.

Figure 7D:
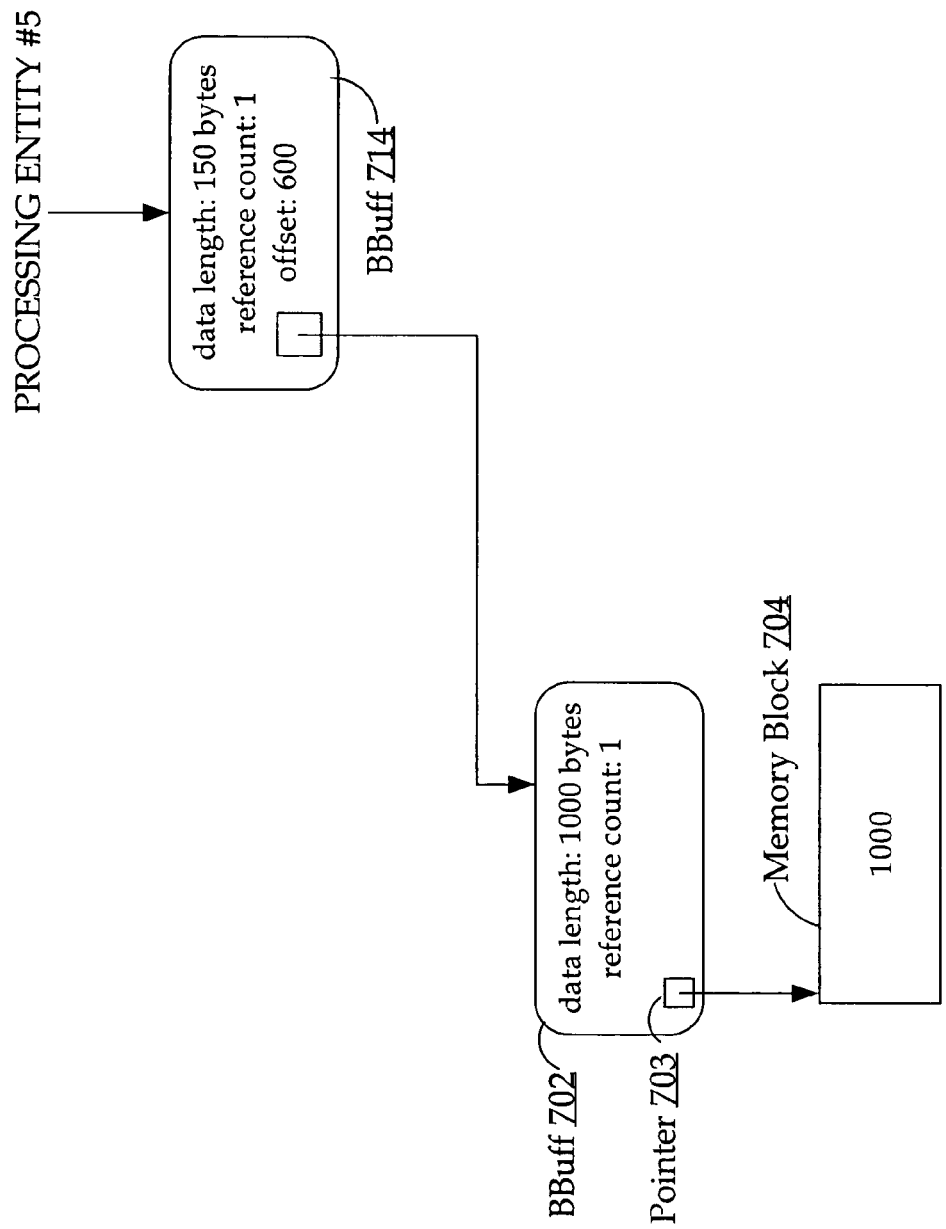

FIG. 7D illustrates the result of processing entity #3 releasing BBuff 706. Before processing entity #3 terminates, it calls the release function on BBuff 706. As a result, the reference count of BBuff 706 decrements from one to zero. Because the reference count decrements to zero, BBuff 706 releases all the memory sources it directly references. In this example, Buff 706 contains references to BBuff 710 and BBuff 702 (see FIG. 7C) and calls the release function on each BBuff. The reference count of BBuff 710 decrements from one to zero, which causes BBuff 710 to release all the memory sources it directly references. In this example, BBuff 710 contains a single pointer to memory block 712. BBuff 710 deallocates memory block 712. The reference count of BBuff 702 decrements from two to one. As a result only process entity #5 remains.

Before processing entity #5 terminates, it calls the release function on BBuff 714. The reference count of BBuff 714 decrements from one to zero, which causes the release function on BBuff 702 to be called. As a result of the release function, the reference count of BBuff 702 also decrements from one to zero, which causes BBuff 702 to release all memory sources it directly references. Because BBuff 702 contains a single pointer to memory block 704, BBuff 702 deallocates memory block 704.

Hardware Overview

Figure 8:
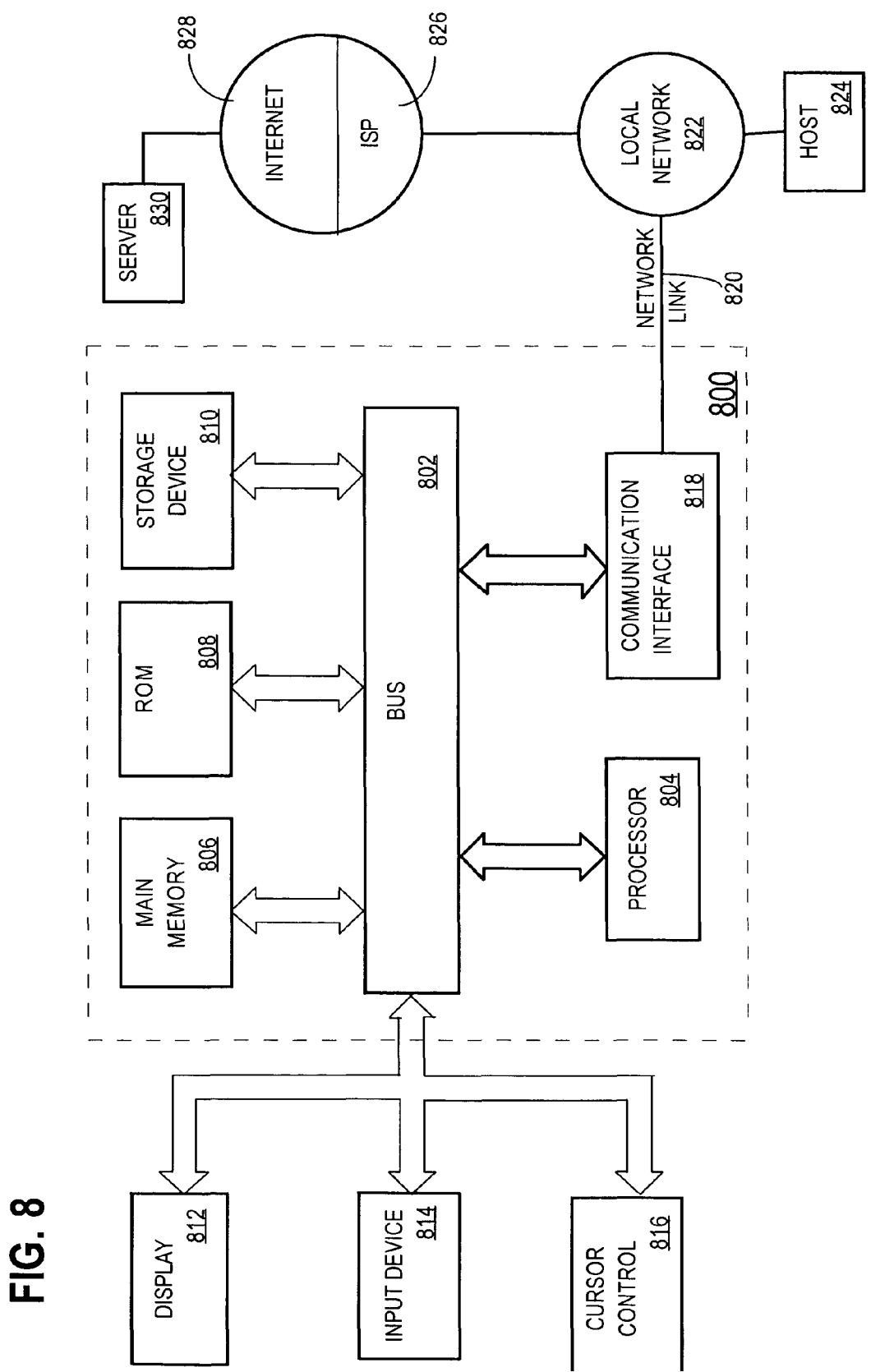
FIG. 8 is a block diagram that illustrates an exemplary computer system, upon which embodiments of the invention may be implemented.

FIG. 8 depicts an exemplary computer system 800, upon which embodiments of the present invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a Liquid Crystal Display (LCD) panel, a cathode ray tube (CRT) or the like, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The exemplary embodiments of the invention are related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The phrases "computer readable medium" and "machine-readable medium" as used herein refer to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape and other legacy media and/or any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

Technical Details Section

Introduction

A BlockBuffer is a data structure for moving data through a processing system. In its simplest form, a BlockBuffer represents a block of memory of known size to which clients can gain direct access. BlockBuffers were designed to simplify the lifecycle management of the blocks of memory containing data as it is transferred between processing stages. In typical use, clients can hand off a BlockBuffer to a subsequent stage and not worry about its final disposal. The code receiving a BlockBuffer can know how to access the data therein without worrying about how that data was assembled nor how the underlying memory was allocated.

BlockBuffers can be used for scatter-gather operations and support subsetting and noncontiguous memory region manipulations. They can be grown by means of appending additional memory blocks or BlockBuffer references. Block-Buffers support an attachment scheme by which arbitrary (CFTyped) data can be associated with a BlockBuffer by name.

Getting at the Data

Once a BlockBuffer is constructed and passed along, a client will need to gain access to the data contained in the memory blocks held by the BlockBuffer. The basic access routine is FigBlockBufferGetDataPointer( ) which provides the caller with a direct pointer to the byte specified by offset within the BlockBuffer's data length. This pointer is good as long as the client retains a reference to the BlockBuffer, even if data are appended to the BlockBuffer.

Because a BlockBuffer may have been assembled from multiple memory blocks, the memory that backs its data length may be noncontiguous. Therefore, when a pointer into a BlockBuffer is acquired, it is necessary to know how much data is addressable at that pointer. FigBlockBufferGetDataPointer( ) returns the length of data available at the returned pointer. A client can use this along with the total data length information to walk all of a BlockBuffer's data (its data always starts at offset zero). Additional API routines are provided to help clients deal with noncontiguous data: FigBlockBufferAccessDataBytes( ), FigBlockBufferCopyDataBytes( ), FigBlockBufferToSimpleBBufCopy( ).

Attachments

BlockBuffers support the attachment of additional data by implementing the FigAttachmentBearer protocol. These additional items are maintained within the BlockBuffer's structure and are referenced by name. A BlockBuffer may only have one attachment with a given name. These items are released when the BlockBuffer is disposed. Attachments are often used to tag the BlockBuffer with information about its origin (e.g. file name, offset, reading time), or various aspects of its processing progress (e.g. completion flags, or metadata).

Data Length and Offsets

A BlockBuffer has a known data length (which can be zero in the case of an empty BlockBuffer), presented as a contiguous set of byte offsets. This is true even if the range is composed of multiple memory blocks and/or references to other BlockBuffers. The data length can be thought of as a logical size. Clients can address any byte in the BlockBuffer's offset range, but must be prepared for this range to be noncontiguous in memory.

CoreFoundation Object

As a CoreFoundation object, BlockBuffers utilize reference counting to manage the lifecycle of the BlockBuffer structures as well as the memory blocks under their control. Disposal of a BlockBuffer is achieved using CFRelease( ). Clients can hand BlockBuffers to others free in the knowledge that they will be cleaned up when the final reference is released. CFAllocators are used to create the BlockBuffer structures and can be used for managing the memory of the underlying memory blocks.

The API FigBlockBufferGetTypeID( ) can be used to obtain the BlockBuffer's CoreFoundation type ID, useful for runtime, debugging checks, and other operations.

The Simplest BlockBuffer

The simplest, useful BlockBuffer wraps a single block of memory. The memory block can be any valid memory region of known size but must remain valid through the lifespan of the BlockBuffer.

In a simple example, a 100 byte memory block is managed by a BlockBuffer. Clients will see the BlockBuffer as having a data length of 100 and can get a pointer to any byte at offset 0 through 99.

Memory Block Management

BlockBuffers support three schemes for managing block memory; they vary in how the memory comes to be allocated and who is responsible for its disposal. See the API FigBlockBufferCreateWithMemoryBlock( ) for more information.

Just Wrap it

In this scheme, a memory block is wrapped in a BlockBuffer and is disposed of or otherwise dealt with by the client after the BlockBuffer is disposed. The client must assure that the life of the memory block is longer than the life of the BlockBuffer. Any type of memory can be managed this way: stack, malloced, read-only-mapped, etc.

Wrap it and Free it for Me

In the second scheme, the client uses a CFAllocator to allocate the memory block and provides this allocator to the BlockBuffer creation. The BlockBuffer code will then use this allocator to de-allocate the memory block when the BlockBuffer is finalized (i.e. when its last CFRelease( ) occurs). Note that a custom CFAllocator could be set up by the client and used just for de-allocation if the client has a special disposal protocol for a memory block.

Allocate it and Free it for Me

In this scheme, the client can defer the allocation of the memory block. When the BlockBuffer is created, no memory block is supplied, but a block size and CFAllocator are provided to enable allocating the memory block on demand. This same allocator is used to free the memory block when the BlockBuffer is disposed. A second allocator can be provided for use in allocating the BlockBuffer data structure itself, allowing the client to control all memory allocations. Note that even if a memory block is not yet allocated, its relevant data length will contribute to its BlockBuffer's overall data length.

Special Memory Blocks

Clients may need to make use of memory blocks that are not readily managed using CFAllocators but still require allocate and free semantics. An example of this would be a piece of memory obtained from a driver. It may be necessary to call special code to free and possibly to allocate this memory. Additionally, some special state may need to be associated with the memory block that is presented to the BlockBuffer routines.

A Custom Block Source structure is used to accomplish this. Passed to the BlockBuffer API routines that accept a block allocator (specifically, FigBlockBufferCreateWithMemoryBlock( ), FigBlockBufferAppendMemoryBlock( ) and FigBlockBufferSimpleBBufCopy( )), it is used in lieu of the allocator when the memory block needs to be allocated or freed.

The Custom Block Source is a structure with the following type:

```
typedef struct {
    void *(*Allocate)(void *refCon, size_t sizeInBytes);
    void (*Free)(void *refCon, void *doomedMemoryBlock);
    void *refCon;
} FigBlockBufferCustomBlockSource;
```

The Allocate( ) routine is called when the memory block is required, either immediately when the BlockBuffer is created, or later, when FigBlockBufferAssureBlockMemory( ) is called. It will be called only once, unless a call to it returns NULL and repeated attempts to call FigBlockBufferAssureBlockMemory( ) are made on the enclosing BlockBuffer. The error kFigBlockBufferBadCustomBlockSourceErr is returned if the Allocate( ) routine is NULL and the BlockBuffer code needs to call it. The Free( ) routine is called once when the BlockBuffer is destroyed, but only if the memory block is non-NULL. The refCon supplied in the Custom Block Source structure is passed to the Allocate( ) and Free( ) routines. If the refCon points to an allocated block of memory, it is in the Free( ) routine where the client should dispose of it.

The Custom Block Source structure's contents are copied (into memory allocated with the structureAllocator) and associated with the memory block. It should be unnecessary for the client to dynamically allocate the structure itself. A client using Custom Block Sources should be prepared for its Allocate( ) or Free( ) routines to be called from multiple threads and under various process and priority conditions, unless special handling of the BlockBuffers in question can be arranged.

Memory Block Details

Block Length Versus Data Length

When dealing with memory blocks, a block length is always indicated. This length specifies the number of bytes that are (or will be) present at the allocated memory address. When the BlockBuffer code allocates the memory block on behalf of the client, this is the size of the block it allocates.

The data length specifies how many bytes are to be made available by the BlockBuffer. Along with a data offset, it is possible to delineate a subset of a memory block anywhere within its block length. The BlockBuffer code uses the block length to range-check this data offset+length combination.

When and how Memory is Allocated

When a block allocator is provided along with a null block, the memory's allocation is deferred until called for. The allocation is achieved with the API FigBlockBufferAssureBlockMemory( ). Given a BlockBuffer, this routine will make sure that all deferred memory allocations (using a CFAllocator or Custom Block Source) are performed. This could potentially be any number of allocations, as a complex BlockBuffer could contain or refer to BlockBuffers that contain unallocated memory blocks.

Buffer References

A BlockBuffer can refer to other BlockBuffers. Just as a subset of a memory block can be made part of a BlockBuffer, so can a subset of another BlockBuffer. A portion of a BlockBuffer's data length can become part of a new BlockBuffer. This subset is specified using an offset and data length. In one example, BlockBuffer A manages all 100 bytes of a memory block. BlockBuffer B refers to BlockBuffer A and subscribes to a subset of 75 bytes starting at offset 25. A client will see that BlockBuffer B has a data length of 75 bytes and can address its bytes at offsets 0 . . . 74, while the actual memory comes from offsets 25-99 in the memory block within Block-Buffer A.

Thus, BlockBuffer A contributes some of its length to BlockBuffer B, the actual data being accessed by recursively visiting the BlockBuffer to get to its memory block. This recursive construction can be arbitrarily deep, and complex combinations of buffer references and memory blocks can be achieved.

When a new reference to a complex BlockBuffer is created, the code will attempt to minimize the number of Block-Buffers involved in implementing the reference. In assembling the reference, it will seek out the one or more Block-Buffers that cover the desired data length, getting as close to the memory block-carrying BlockBuffers as possible. This is known as the Depth Reduction Optimization.

Appending

A BlockBuffer can grow beyond its initial size by means of appending additional memory blocks or BlockBuffer references. FigBlockBufferAppendMemoryBlock( ) and Fig-BlockBufferAppendBufferReference( ) are the relevant APIs. The additional data length specified to these APIs is added to the BlockBuffer's current data length. From then on, the BlockBuffer will present a data offset range of 0 . . . (oldDataLength+addedDataLength−1). BlockBuffers never shrink, and any additions are contiguous in offsets, though the memory may be noncontiguous. This method of growing a BlockBuffer assures that any previously-obtained pointers (see FigBlockBufferGetDataPointer( )) remain valid.

It is possible to create an empty BlockBuffer, using Fig-BlockBufferCreateEmpty( ), to which memory blocks or buffer references can be appended at a later time. An empty BlockBuffer can be retained by client structures and will report a data length of zero.

Appending to a BlockBuffer is not a thread-safe operation, so care should be taken when manipulating BlockBuffers in this way from multiple threads. This restriction represents a tradeoff since complete thread safety would require the frequent use of locks.

The Empty BlockBuffer

It is possible, using FigBlockBufferCreateEmpty( ), to create a totally empty BlockBuffer, one which has no memory or references associated with it, and which reports zero for its data length. An empty BlockBuffer is useful for passing to an API that will fill it in using append operations (where one would have passed an empty handle in days of yore). Also, it may be desirable to create the BlockBuffer structure using a particular CFAllocator or to have Attachments (see below) attached to a BlockBuffer before its underlying data shows up. See the Scenarios section for more specific examples.

Expansion

By default, all BlockBuffers permit the appending of additional data. To accommodate these additional blocks or references, the BlockBuffer's structure may need to grow. This expansion is done in terms of subBlocks, a subBlock being either a memory block or a BlockBuffer reference. All Block-Buffers are set up to accommodate a default number of sub-Blocks, but this number can be controlled in the BlockBuffer creation APIs. If a client expects to do a large number of append operations, the BlockBuffer could be created with a larger initial subBlock capacity. This will help the Block-Buffer code to size its structures appropriately with the goal of minimizing overhead. Generally, a client need not worry about a specific subBlock capacity; passing zero will cause correct, default operation.

BlockBuffers and Threading

When using BlockBuffers in a multi-threaded program, care must be taken when performing certain operations, while some BlockBuffer features make some threaded operations easier.

BlockBuffers do not contain any locks or mutexes, so operations that modify them, e.g. appending and adding attachments, must be protected by the client. In common usage, BlockBuffer assembly (creation plus appending blocks and references) is done before a BlockBuffer is passed to other threads, so protection for those operations may not be necessary.

As was mentioned elsewhere, pointers obtained with Fig-BlockBufferGetDataPointer( ) stay valid as long as the client has a retain count on the BlockBuffer. This is true even after additional blocks and/or references are appended to the BlockBuffer, even by other threads.

If custom CFAllocators are used with the BlockBuffer-creation functions, they must be able to operate in a multi-threaded environment if the BlockBuffers they are associated with migrate between threads.

Some Usage Scenarios

Walking a BlockBuffer with FigBlockBufferGet-DataPointer( )

This example shows how to process an entire, potentially noncontiguous BlockBuffer. The client discovers how much data is accessible at each step.

```
// Write the contents of a BlockBuffer to a file
OSStatus WriteBlockBuffer(FigBlockBufferRef bbuf, FILE *ofp)
{
    size_t      offset;
    size_t      lengthAtOffset;
    size_t      totalLength;
    char        *dataPointer;
    offset = 0; // Always start at the beginning
    do {
        result = FigBlockBufferGetDataPointer(
                        bbuf,
                        offset,
                        &lengthAtOffset,
                        &totalLength,
                        &dataPointer);
        if (result == kFigBlockBufferNoErr) {
            // We write the number of bytes we can
            // currently reach
            fwrite (dataPointer, lengthAtOffset, 1, ofp);
            offset += lengthAtOffset; // Move along
        } else {
            break;          // BlockBuffer problem
        }
    } while (offset < totalLength);
    return result;
}
```

Obtaining Data from a Reading Subsystem

We want to create the sample API GoReadSomeDataAnd-CallMeBack( ), that will use a BlockBuffer to return the data we will read. Assume that the API has this form:

GoReadSomeDataAndCallMeBack(file, offset, length, FigBlockBufferRef destination, callback, refcon)

and that the callback function has this form:

void (*MyCallback)(void*refcon, FigBlockBufferRef theBuffer, OSStatus readError);

We could set up the destination BlockBuffer to operate in a number of different ways:

1. Fill my buffer for me

The client sets up a BlockBuffer, with a pre-allocated memory block. GoReadSomeDataAndCallMeBack( ) will read the data and deposit it in this BlockBuffer's memory.

```
char     *myMemoryBlock;
FigBlockBufferRef bbuf;
OSStatus    result;
myMemoryBlock = malloc(BLOCK_SIZE);
result = FigBlockBufferCreateWithMemoryBlock(
        kCFAllocatorDefault,        // Use default allocator
        myMemoryBlock,              // Here's my block
        BLOCK_SIZE,                 // Block length
        kCFAllocatorMalloc,         // Use malloc allocator to dispose
        NULL,                       // No Custom Block Source
        0,                          // Data at offset zero
        BLOCK_SIZE,                 // Block is all data
        0,                          // Default subBlocks
        0,                          // No flags
        &bbuf);                     // Our new BlockBuffer
if (result == kFigBlockBufferNoErr) {
    // GoRead... will deposit the data in my bbuf
    GoReadSomeDataAndCallMeBack(file, offset,
        BLOCK_SIZE, bbuf, MyCallBack, myRefCon);
}
```

Here is the callback for this example:

```
void MyCallback(void *refCon, FigBlockBufferRef theBuffer, OSStatus readError)
{
    MyState    state = (MyState)refCon;
    if (readError == 0) {
        CFRetain(theBuffer);    // We'll be hanging onto it
        MarkDataReady(state, theBuffer);
    }
}
```

2. Put the memory (and data) here

The client provides an empty BlockBuffer to which GoReadSomeDataAndCallMeBack( ) will append a memory block containing the read data, or more interestingly, a buffer reference to a possibly cached BlockBuffer that already contains the data, saving a copy operation. As far as the client is concerned, his BlockBuffer contains the data.

```
FigBlockBufferRef bbuf;
OSStatus    result;
result = FigBlockBufferCreateEmpty(
        kCFAllocatorDefault,// Use default allocator
        0,          // Default subBlocks
        0,          // No flags
        &bbuf);     // Our new BlockBuffer
if (result == kFigBlockBufferNoErr) {
    // Annotate the blockBuffer
    (void)FigSetAttachment(bbuf,
            CFSTR("MyReadType"),
            CFSTR("Normal"), 0);
    // GoRead... will append memory block(s) and/or buffer
    // references containing the data to my bbuf
    GoReadSomeDataAndCallMeBack(file, offset,
        BLOCK_SIZE, bbuf, MyCallBack, myRefCon);
}
```

3. Call me back with a BlockBuffer

The callback to GoReadSomeDataAndCallMeBack( ) could accept a BlockBuffer as a parameter. Furthermore, the client could pass NULL for the destination BlockBuffer. GoReadSomeDataAndCallMeBack( ) would then create or re-use a BlockBuffer containing the desired bytes. The client would retain this BlockBuffer and be assured of its orderly disposal.

The callback illustrated here is the same used for all of the examples. Since the sample API permits three methods of BlockBuffer passing, the callback accepts a BlockBuffer as a parameter. It needn't care whether the BlockBuffer was passed in by the client at the top level (though it will be the same one when it gets here), or synthesized by the reading code. Because the client needs to hang onto the BlockBuffer, it must be retained here in the callback.

```
void MyCallback(void *refCon, FigBlockBufferRef theBuffer, OSStatus readError)
{
    MyState    state = (MyState)refCon;
    if (readError == 0) {
        CFRetain(theBuffer);    // We'll be hanging onto it
        MarkDataReady(state, theBuffer);
    }
}
```

Breaking a Chunk into Individual Frames

In a video processing system it is possible to receive many compressed frames in one disk read. Subsequent processing stages would like the frames to arrive in individual Block-Buffers. For this example, assume that the disk read was received in a BlockBuffer. Several frame BlockBuffers are created that reference this larger buffer. Reference counting assures that when the video processor is finished with the last frame, the disk-read BlockBuffer will be disposed.

```
OSStatus  BreakIntoFrames(FigBlockBufferRef chunkOfFrames,
                size_t frameSize,
                int numFrames,
                FigBlockBufferRef frameBBufArray[])
{
    OSStatus   result = kFigBlockBufferNoErr;
    size_t     totalFrameSizeExpected;
    size_t     chunkDataSize;
    // Do a sanity check to assure we have enough data for the
    // expected number of frames. This sample code assumes that
    // each frame has the same size.
    totalFrameSizeExpected = numFrames * frameSize;
    chunkDataSize = FigBlockBufferGetDataLength(chunkOfFrames);
    if chunkDataSize >= totalFrameSizeExpected) {
        int        i;
        size_t     runningOffset;// Offset to frame within chunk
        // Make a new BlockBuffer for each frame
        runningOffset = 0;
        for (i = 0; i < numFrames && result ==
kFigBlockBufferNoErr; ++i) {
            result = FigBlockBufferCreateWithBufferReference(
                kCFAllocatorDefault,// Use default allocator
                chunkOfFrames,      // Each frame refers to this
                runningOffset,      // Find frame within chunk
                frameSize,          // Each has the same size
                1,                  // Don't expect more than one
                0,                  // Defaults OK
                &frameBBufArray[i]);
            runningOffset += frameSize;
        }
    } else {
        result = kBadChunkErr;
    }
    return result;
}
```

If the client doesn't want to deal with potentially noncontiguous frame data, the FigBlockBufferCreateWithBufferReference( ) call can be replaced with FigBlockBufferTo- SimpleBBufCopy( ). In both cases, new BlockBuffers are always created, but some may be new, memory-backed copies of the chunk's data.

```
OSStatus    BreakIntoFrames(FigBlockBufferRef chunkOfFrames,
                size_t frameSize,
                int numFrames,
                FigBlockBufferRef frameBBufArray[])
{
    OSStatus    result = kFigBlockBufferNoErr;
    size_t      totalFrameSizeExpected;
    size_t      chunkDataSize;
    // Do a sanity check to assure we have enough data for the
    // expected number of frames
    totalFrameSizeExpected = numFrames * frameSize;
    chunkDataSize = FigBlockBufferGetDataLength(chunkOfFrames);
    if (chunkDataSize >= totalFrameSizeExpected) {
        int     i;
        size_t  runningOffset;// Offset to frame within chunk
        // Make a new BlockBuffer for each frame
        runningOffset = 0;
        for (i = 0; i < numFrames && result ==
kFigBlockBufferNoErr; ++i) {
            result = FigBlockBufferToSimpleBBufCopy(
                kCFAllocatorDefault,    // Use default allocator
                chunkOfFrames,          // Frames from here
                kCFAllocatorDefault,    // Use default allocator
                for blocks, too
                NULL,                   // No Custom Block Source
                runningOffset,          // Find frame within chunk
                frameSize,              // Each has the same size
                1,                      // Don't expect more than one
                0,                      // Defaults OK
                &frameBBufArray[i]);
            runningOffset += frameSize;
        }
    } else {
        result = kBadChunkErr;
    }
    return result;
}
```

Gathering Packet Payloads into One Frame

This is the inverse of the previous example, pieces of a frame are spread across multiple packets. Many of these packets have been read up into a single BlockBuffer. We want to deliver a frame as a logically contiguous whole, so we assemble a new BlockBuffer composed of the packet payloads.

```
OSStatus BuildAFrame(FigBlockBufferRef packetBBuf, int numPackets,
size_t headerSize, size_t dataSize, FigBlockBufferRef *frameBBuf)
{
    OSStatus result;
    size_t expectedDataLength;
    size_t packetBBufDataLength;
    expectedDataLength = numPackets * (headerSize + dataSize);
    packetBBufDataLength = FigBlockBufferGetDataLength(packetBBuf);
    if (expectedDataLength <= packetBBufDataLength) {
        // Create an empty BlockBuffer to start with
        result = FigBlockBufferCreateEmpty(kCFAllocatorDefault,
frameBBuf);
        if (result == kFigBlockBufferNoErr) {
            int     i;
            size_t  runningOffset;
            // Skip the first packet header
            runningOffset = headerSize;
            for (i = 0; i < numPackets && result== kFigBlockBufferNoErr;
++i) {
                result = FigBlockBufferAppendBufferReference(
                    *frameBBuf,
                    packetBBuf,
                    runningOffset,
                    datasize,
                    0);
                runningOffset += (headerSize + dataSize);
            }
            if (result != kFigBlockBufferNoErr) {
                CFRelease(*frameBBuf);
                *frameBBuf = NULL;
            }
        }
    } else {
        result = kBadPacketBBufErr;
    }
    return result;
}
```

The client might not be able to deal with the frame as a noncontiguous memory area. Depending on how he needs to traverse it, the various data accessing APIs can help. A client who just can't cope can obtain a guaranteed-contiguous BlockBuffer using FigBlockBufferToSimpleBBufCopy( ), without first checking whether the BlockBuffer is indeed noncontiguous (though this always results in a new Block-Buffer being created).

Here are two ways to end up with a pointer to a contiguous set of frame bytes:

```
    // I always know how big the frame is
    size_t frameDataSize = numpackets * dataSize;
    char    * myFrameMemory;
    myFrameMemory = CFAllocatorAllocate(NULL, frameDataSize);
    // Simplest example: copy the data out into a malloced buffer
    (void)FigBlockBufferCopyDataBytes(frameBBuf,    // Frame's in here
        0,                  // First byte starts it
        frameDataSize,      // We know its size
        myFrameMemory);     // Put its bytes here
    // Alternatively, we could take a chance that the frame bytes are
    // contiguous (we might not know that this frame was assembled as
    // shown above)
    char    *myFramePointer;
    (void) FigBlockBufferAccessDataBytes(frameBBuf,  // Frame's in here
        0,                  // First byte starts it
        frameDataSize,      // We know its size
        myFrameMemory,      // Use this buffer if needed
        &myFramePointer);   // Point me at the data
    // When FigBlockBufferAccessDataBytes returns, myFramePointer will
either point
    // directly into frameBBuf, or will point to myFrameMemory, in which
    // case the data was actually copied.
```

The API

The BlockBuffer interface can be found in BlockBuffer.h

Types typedef struct OpaqueFigBlockBuffer

```
    *FigBlockBufferRef;
    typedef uint32_t FigBlockBufferFlags;
    typedef struct {
        void *(*Allocate) (void *refCon, size_t sizeInBytes);
        void (*Free) (void *refCon, void *doomedMemoryBlock);
        void *refCon;
    } FigBlockBufferCustomBlockSource;
```

Functions
FigBlockBufferCreateEmpty
Creates an empty BlockBuffer

```
extern OSStatus FigBlockBufferCreateEmpty(
    CFAllocatorRef structureAllocator,
    uint32_t subBlockCapacity,
    FigBlockBufferFlags flags,
    FigBlockBufferRef *newBBufOut);
```

| | Parameter Descriptions |
|---|---|
| StructureAllocator | Allocator to use for allocating the BlockBuffer object. NULL will cause the default allocator to be used. |
| subBlockCapacity | Number of subBlocks the new BlockBuffer shall accommodate before expansion occurs. A value of zero means "do the reasonable default" |
| Flags | Feature and control flags |
| newBBufOut | Receives newly-created empty BlockBuffer object with retain count of 1. Must not be NULL. |
| function result | Returns kFigBlockBufferNoErr if successful. |

Discussion

Creates an empty BlockBuffer, i.e. one that has no memory block nor reference to a BlockBuffer supplying bytes to it. It is ready to be populated using FigBlockBufferAppendMemoryBlock( ) and/or FigBlockBufferAppendBufferReference( ). FigBlockBufferGetDataLength( ) will return zero for an empty BlockBuffer and FigBlockBufferGetDataPointer( ) and FigBlockBufferAssureBlockMemory( ) will fail. The memory for the BlockBuffer object will be allocated using the given allocator. If NULL is passed for the allocator, the default allocator is used.

FigBlockBufferCreateWithMemoryBlock

Creates a new BlockBuffer backed by a memory block (or promise thereof).

```
extern OSStatus
FigBlockBufferCreateWithMemoryBlock(
    CFAllocatorRef structureAllocator,
    void *memoryBlock,
    size_t blockLength,
    CFAllocatorRef blockAllocator,
    FigBlockBufferCustomBlockSource *customBlockSource,
    size_t offsetToData,
    size_t dataLength,
    FigBlockBufferFlags flags,
    FigBlockBufferRef *newBBufOut);
```

| | Parameter Descriptions |
|---|---|
| structureAllocator | Allocator to use for allocating the BlockBuffer object. NULL will cause the default allocator to be used. |
| memoryBlock | Block of memory to hold buffered data. If NULL, a memory block will be allocated when needed (via a call to FigBlockBufferAssureBlockMemory( )) using the provided blockAllocator. If non-NULL, the block will be used and will be deallocated when the new BlockBuffer is finalized (i.e. released for the last time) if blockAllocator is not kCFAllocatorNull. |
| blockLength | Overall length of the memory block in bytes. Must not be zero. This is the size of the supplied memory block or the size to allocate if memoryBlock is NULL. |
| blockAllocator | Allocator to be used for allocating the memoryBlock, if memoryBlock is NULL. If memoryBlock is non-NULL, this allocator will be used to deallocate it if provided. Passing NULL will cause the default allocator (as set at the time of the call) to be used. Pass kCFAllocatorNull if no deallocation is desired. |
| customBlockSource | If non-NULL, it will be used for the allocation and freeing of the memory block (the blockAllocator parameter is ignored). If provided, and the memoryBlock parameter is NULL, its Allocate( ) routine must be non-NULL. Allocate will be called once, if successful, when the memoryBlock is allocated. Free( ) will be called once when the BlockBuffer is disposed. |
| offsetToData | Offset within the memoryBlock at which this BlockBuffer should refer to data. |
| dataLength | Number of relevant data bytes, starting at offsetToData, within the memory block. |
| Flags | Feature and control flags |
| newBBufOut | Receives newly-created BlockBuffer object with a retain count of 1. Must not be NULL. |
| function result | Returns kFigBlockBufferNoErr if successful. |

Discussion

Creates a new BlockBuffer backed by a memory block. The memory block may be statically allocated, dynamically allocated using the given allocator (or customBlockSource) or not yet allocated. The returned BlockBuffer may be further expanded using FigBlockBufferAppendMemoryBlock( ) and/or FigBlockBufferAppendBufferReference( ). If the kFigBlockBufferAssureMemoryNowFlag is set in the flags parameter, the memory block is allocated immediately using the blockAllocator or customBlockSource, if present. □

FigBlockBufferCreateWithBufferReference

Creates a new BlockBuffer that refers to another BlockBuffer.

```
extern OSStatus
FigBlockBufferCreateWithBufferReference(
    CFAllocatorRef structureAllocator,
    FigBlockBufferRef targetBuffer,
    size_t offsetToData,
    size_t dataLength,
    FigBlockBufferFlags flags,
    FigBlockBufferRef *newBBufOut);
```

| | Parameter Descriptions |
|---|---|
| structureAllocator | Allocator to use for allocating the BlockBuffer object. NULL will cause the default allocator to be used. |
| targetBuffer | BlockBuffer to refer to. This parameter must not be NULL. Unless the kFigBlockBufferPermitEmptyReferenceFlag |

| Parameter Descriptions | |
|---|---|
| | is passed, it must not be empty and it must have a data length at least large enough to supply the data subset specified (i.e. offsetToData+dataLength bytes). |
| offsetToData | Offset within the target BlockBuffer at which the new BlockBuffer should refer to data. |
| dataLength | Number of relevant data bytes, starting at offsetToData, within the target BlockBuffer. |
| flags | Feature and control flags |
| newBBufOut | Receives newly-created BlockBuffer object with a retain count of 1. Must not be NULL. |
| function result | Returns kFigBlockBufferNoErr if successful. |

Discussion

Creates a new BlockBuffer that refers to (a possibly subset portion of) another BlockBuffer. The returned BlockBuffer may be further expanded using FigBlockBufferAppendMemoryBlock( ) and/or FigBlockBufferAppendBufferReference( ).

FigBlockBufferToSimpleBBufCopy

Produces a new BlockBuffer containing a contiguous reference to the data specified by the parameters.

```
extern OSStatus FigBlockBufferToSimpleBBufCopy(
CFAllocatorRef structureAllocator,
FigBlockBufferRef sourceBuffer,
CFAllocatorRef blockAllocator,
FigBlockBufferCustomBlockSource *customBlockSource,
size_t offsetToData,
size_t dataLength,
FigBlockBufferFlags flags,
FigBlockBufferRef *newBBufOut);
```

| Parameter Descriptions | |
|---|---|
| structureAllocator | Allocator to use for allocating the BlockBuffer object. NULL will cause the default allocator to be used. |
| theSourceBuffer | BlockBuffer from which data will be copied or referenced. Must not be NULL nor empty, |
| blockAllocator | Allocator to be used for allocating the memoryBlock if a contiguous copy of the data is to be made. Passing NULL will cause the default allocator (as set at the time of the call) to be used |
| customBlockSource | If non-NULL, it will be used for the allocation and freeing of the memory block (the blockAllocator parameter is ignored). If provided, and the memoryBlock parameter is NULL, its Allocate( ) routine must be non-NULL. Allocate will be called once, if successful, when the memoryBlock is allocated. Free( ) will be called once when the BlockBuffer is disposed. |
| offsetToData | Offset within the source BlockBuffer at which the new BlockBuffer should obtain data. |
| dataLength | Number of relevant data bytes, starting at offsetToData, within the source BlockBuffer. If zero, the target buffer's total available dataLength (starting at offsetToData) will be referenced. |

| Parameter Descriptions | |
|---|---|
| flags | Feature and control flags |
| newBBufOut | Receives newly-created BlockBuffer object with a retain count of 1. Must not be NULL. |
| function result | Returns kFigBlockBufferNoErr if successful |

Discussion

Produces a BlockBuffer containing a contiguous reference to the data specified by the parameters. The resulting new BlockBuffer may contain an allocated copy of the data, or may contain a contiguous BlockBuffer reference. If the kFigBlockBufferAlwaysCopyDataFlag is set in the flags parameter, the resulting BlockBuffer will contain an allocated copy of the data rather than a reference to theSourceBuffer. The given blockAllocator or customBlockSource is used to obtain this memory.

FigBlockBufferGetTypeID

Obtains the CoreFoundation type ID for the BlockBuffer type.

extern CFTypeID FigBlockBufferGetTypeID(void);

| | |
|---|---|
| function result | Returns the CFTypeID corresponding to FigBlockBuffer. |

Discussion

Obtains the CoreFoundation type ID for the FigBlockBuffer type.

FigBlockBufferAppendMemoryBlock

Adds a memoryBlock to an existing BlockBuffer.

```
extern OSStatus FigBlockBufferAppendMemoryBlock(
FigBlockBufferRef theBuffer,
void *memoryBlock,
size_t blockLength,
CFAllocatorRef blockAllocator,
FigBlockBufferCustomBlockSource *customBlockSource,
size_t offsetToData,
size_t dataLength,
FigBlockBufferFlags flags);
```

| Parameter Descriptions | |
|---|---|
| theBuffer | BlockBuffer to which the new memoryBlock will be added. Must not be NULL |
| memoryBlock | Block of memory to hold buffered data. If NULL, a memory block will be allocated when needed (via a call to FigBlockBufferAssureBlockMemory( )) using the provided blockAllocator. If non-NULL, the block will be used and will be deallocated when the BlockBuffer is finalized (i.e. released for the last time) if blockAllocator is not kCFAllocatorNull. |
| blockLength | Overall length of the memory block in bytes. Must not be zero. This is the size of the supplied memory block or the size to allocate if memoryBlock is NULL. |
| blockAllocator | Allocator to be used for allocating the memoryBlock, if memoryBlock is NULL. |

-continued

| | Parameter Descriptions |
|---|---|
| | If memoryBlock is non-NULL, this allocator will be used to deallocate it if provided. Passing NULL will cause the default allocator (as set at the time of the call) to be used. Pass kCFAllocatorNull if no deallocation is desired. |
| customBlockSource | If non-NULL, it will be used for the allocation and freeing of the memory block (the blockAllocator parameter is ignored). If provided, and the memoryBlock parameter is NULL, its Allocate( ) routine must be non-NULL. Allocate will be called once, if successful, when the memoryBlock is allocated. Free( ) will be called once when the BlockBuffer is disposed. |
| offsetToData | Offset within the memoryBlock at which the BlockBuffer should refer to data. |
| dataLength | Number of relevant data bytes, starting at offsetToData, within the memory block. |
| flags | Feature and control flags |
| function result | Returns kFigBlockBufferNoErr if successful. |

Discussion

Adds a memoryBlock to an existing BlockBuffer. The memory block may be statically allocated, dynamically allocated using the given allocator (or customBlockSource) or not yet allocated. The blockbuffer's total data length will be increased by the specified dataLength. ☐☐ If the kFigBlockBufferAssureMemoryNowFlag is set in the flags parameter, the memory block is allocated immediately using the blockAllocator or customBlockSource. Note that append operations are not thread safe, so care must be taken when appending to BlockBuffers that are used by multiple threads.

FigBlockBufferAppendBufferReference

Adds a BlockBuffer reference to an existing BlockBuffer.

```
extern OSStatus
FigBlockBufferAppendBufferReference(
    FigBlockBufferRef theBuffer,
    FigBlockBufferRef targetBBuf,
    size_t offsetToData,
    size_t dataLength,
    FigBlockBufferFlags flags);
```

| | Parameter Descriptions |
|---|---|
| theBuffer | BlockBuffer to which the new BlockBuffer reference will be added. Must not be NULL |
| targetBuffer | BlockBuffer to refer to. This parameter must not be NULL. Unless the kFigBlockBufferPermitEmptyReferenceFlag is passed, it must not be empty and it must have a data length at least large enough to supply the data subset specified (i.e. offsetToData+dataLength bytes). |
| offsetToData | Offset within the target BlockBuffer at which the BlockBuffer should refer to data. |
| dataLength | Number of relevant data bytes, starting at offsetToData, within the target BlockBuffer. If zero, the target buffer's total available dataLength (starting at offsetToData) will be referenced. |

-continued

| | Parameter Descriptions |
|---|---|
| Flags | Feature and control flags |
| function result | Returns kFigBlockBufferNoErr if successful. |

Discussion

Adds a buffer reference to (a possibly subset portion of) another BlockBuffer to an existing BlockBuffer. The BlockBuffer's total data length will be increased by the specified dataLength. Note that append operations are not thread safe, so care must be taken when appending to BlockBuffers that are used by multiple threads.

FigBlockBufferAssureBlockMemory

Assures all memory blocks in a BlockBuffer are allocated.

extern OSStatus FigBlockBufferAssureBlockMemory(
FigBlockBufferRef theBuffer);

| | Parameter Descriptions |
|---|---|
| theBuffer | BlockBuffer to operate on. Must not be NULL |
| function result | Returns kFigBlockBufferNoErr if successful. |

Discussion

Traverses the possibly complex BlockBuffer, allocating the memory for any constituent memory blocks that are not yet allocated. ☐

FigBlockBufferAccessDataBytes

Accesses potentially noncontiguous data in a BlockBuffer.

```
extern OSStatus FigBlockBufferAccessDataBytes(
    FigBlockBufferRef theBuffer,
    size_t offset,
    size_t length,
    char *temporaryBlock,
    char **returnedPointer);
```

| | Parameter Descriptions |
|---|---|
| theBuffer | BlockBuffer to operate on. Must not be NULL |
| Offset | Offset within the BlockBuffer's offset range. |
| Length | Desired number of bytes to access at offset |
| temporaryBlock | A piece of memory, assumed to be at least length bytes in size. Must not be NULL |
| returnedPointer | Receives NULL if the desired amount of data could not be accessed at the given offset. Receives non-NULL if it could. The value returned will either be a direct pointer into the BlockBuffer or temporaryBlock Must not be NULL. |
| function result | Returns kFigBlockBufferNoErr if the desired amount of data could be accessed at the given offset. |

Discussion

Used for accessing potentially noncontiguous data, this routine will return a pointer directly into the given Block- Buffer if possible, otherwise the data will be assembled and copied into the given temporary block and its pointer will be returned.

FigBlockBufferCopyDataBytes

Copies bytes from a BlockBuffer into a provided memory area.

```
extern OSStatus FigBlockBufferCopyDataBytes(
    FigBlockBufferRef theSourceBuffer,
    size_t offsetToData,
    size_t dataLength,
    char*destination);
```

| Parameter Descriptions | |
|---|---|
| theSourceBuffer | The BlockBuffer from which data will be copied into the destination |
| offsetToData | Offset within the source BlockBuffer at which the copy should begin. |
| dataLength | Number of bytes to copy, starting at offsetToData, within the source BlockBuffer. Must not be zero. |
| Destination | Memory into which the data should be copied. |
| function result | Returns kFigBlockBufferNoErr if the copy succeeded, returns false otherwise. |

Discussion

This function is used to copy bytes out of a BlockBuffer into a provided piece of memory. It deals with the possibility of the desired range of data being noncontiguous. The function assumes that the memory at the destination is sufficient to hold the data. If length bytes of data are not available in the BlockBuffer, an error is returned and the contents of the destination are undefined.

FigBlockBufferGetDataPointer

Gains access to the data represented by a BlockBuffer.

```
extern OSStatus FigBlockBufferGetDataPointer(
    FigBlockBufferRef theBuffer,
    size_t offset,
    size_t *lengthAtOffset,
    size_t *totalLength,
    char **dataPointer);
```

| Parameter Descriptions | |
|---|---|
| theBuffer | BlockBuffer to operate on. Must not be NULL |
| offset | Offset within the BlockBuffer's offset range. |
| lengthAtOffset | On return, contains the amount of data available at the specified offset. May be NULL. |
| totalLength | On return, contains the BlockBuffer's total data length (from offset 0). May be NULL. The caller can compare (offset+lengthAtOffset) with totalLength to determine whether the entire BlockBuffer has been referenced and whether it is possible to access the BlockBuffer's data with a contiguous reference. |
| dataPointer | On return, contains a pointer to the data byte at the specified offset; lengthAtOffset bytes are available at this address. May be NULL. |
| function result | Returns kFigBlockBufferNoErr if data was accessible at the specified offset within the given BlockBuffer, false otherwise. |

Discussion

Gains access to the data represented by a BlockBuffer. A pointer into a memory block is returned which corresponds to the offset within the BlockBuffer. The number of bytes addressable at the pointer can also be returned. This length-at-offset may be smaller than the number of bytes actually available starting at the offset if the dataLength of the BlockBuffer is covered by multiple memory blocks (a noncontiguous BlockBuffer). The data pointer returned will remain valid as long as the original BlockBuffer is referenced—once the BlockBuffer is released for the last time, any pointers into it will be invalid.

FigBlockBufferGetDataLength

Obtains the total data length reachable via a BlockBuffer.

```
extern size_t FigBlockBufferGetDataLength(
    FigBlockBufferRef theBuffer);
```

| Parameter Descriptions | |
|---|---|
| theBuffer | BlockBuffer to examine. |
| function result | Returns the total data length available via this BlockBuffer, or zero if it is empty, NULL, or somehow invalid. |

Discussion

Obtains the total data length reachable via a BlockBuffer. This total is the sum of the dataLengths of the BlockBuffer's memoryBlocks and BlockBuffer references. Note that, for BlockBuffer references, the dataLengths are the portions of those constituents that this BlockBuffer subscribes to. This BlockBuffer presents a contiguous range of offsets from zero to its totalDataLength as returned by this routine.

Determines whether the specified range within the given BlockBuffer is contiguous.

```
extern Boolean FigBlockBufferIsRangeContiguous (
    FigBlockBufferRef theBuffer,
    size_t offset,
    size_t length);
```

| Parameter Descriptions | |
|---|---|
| theBuffer | BlockBuffer to examine. |
| offset | Offset within the BlockBuffer's offset range. |

| Parameter Descriptions | |
|---|---|
| length | Desired number of bytes to access at offset. If zero, the number of bytes available at offset (dataLength – offset), contiguous or not, is used. |
| function result | Returns true if the specified range is contiguous within the BlockBuffer, false otherwise or if theBuffer is empty, NULL, or somehow invalid |

Discussion

Determines whether the specified range within the given BlockBuffer is contiguous. if FigBlockBufferGetDataPointer( ) were to be called with the same parameters, the returned pointer would address the desired number of bytes.

FigBlockBufferIsEmpty

Indicates whether the given BlockBuffer is empty.

```
extern Boolean FigBlockBufferIsEmpty(
    FigBlockBufferRef theBuffer);
```

| Parameter Descriptions | |
|---|---|
| theBuffer | BlockBuffer to examine. |
| function result | Returns the true if the BlockBuffer is empty, false otherwise or if theBuffer is empty, NULL, or somehow invalid. |

Discussion

Indicates whether the given BlockBuffer is empty, i.e., devoid of any memoryBlocks or blockBuffer references. Note that a BlockBuffer containing a not-yet allocated memoryBlock is not considered empty. ☐

| Errors | |
|---|---|
| kFigBlockBufferNoErr | Success |
| kFigBlockBufferStructureAllocationFailedErr | Returned when a BlockBuffer-creating API gets a failure from the CFAllocator provided for BlockBuffer construction. |
| kFigBlockBufferBlockAllocationFailedErr | Returned when the allocator provided to allocate a memory block (as distinct from BlockBuffer structures) fails. |
| kFigBlockBufferBadCustomBlockSourceErr | The custom block source's Allocate( ) routine was NULL when an allocation was attempted. |
| kFigBlockBufferBadOffsetParameterErr | The offset provided to an API is out of the range of the relevant BlockBuffer. |
| kFigBlockBufferBadLengthParameterErr | The length provided to an API is out of the range of the relevant BlockBuffer, or is not allowed to be zero. |
| kFigBlockBufiferBadPointerParameterErr | A pointer parameter (e.g. BlockBuffer reference, destination memory) is NULL or otherwise invalid. |
| kFigBlockBufferEmptyBBufErr | A BlockBuffer was passed to a routine that expected it to be non-empty. |

| Flags | |
|---|---|
| kFigBlockBufferAssureMemoryNowFlag | When passed to routines that accept block allocators, causes the memory block to be allocated immediately. |
| kFigBlockBufferAlwaysCopyDataFlag | Used with FigBlockBufferToSimpleBBufCopy( ) to cause it to always produce an allocated copy of the desired data rather than a reference to the source BlockBuffer. |
| kFigBlockBufferDontOptimizeDepthFlag | Passed to FigBlockBufferAppendBufferReference( ) and FigBlockBufferCreateWithBufferReference to suppress reference depth optimization |
| kFigBlockBufferPermitEmptyReferenceFlag | Passed to FigBlockBufferAppendBufferReference( ) and FigBlockBufferCreateWithBufferReference to allow references into a BlockBuffer that may not yet be populated. |

EQUIVALENTS & MISCELLANEOUS

In the foregoing specification, exemplary embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction and including their equivalents. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for handling discontiguous blocks of memory, comprising:
    passing a first data structure from a first processing entity to a second processing entity, wherein the first data structure represents a first amount of memory; and
    the second processing entity accessing a portion of the first amount of memory by:
        determining that the portion of the first amount of memory is located in memory represented by a second data structure that is of a similar type as the first data structure;
        following a reference to the second data structure;
        determining that the second data structure contains a pointer to a block of memory that comprises the portion; and
        using the pointer to access the portion;
    wherein the step of passing is performed on one or more computing devices.

2. The method of claim 1, wherein:
    the first data structure contains the reference;
    the second data structure represents a second amount of memory;
    the first amount of memory, represented by the first data structure, overlaps with the second amount of memory, represented by the second data structure, such that a particular amount of memory is entirely contained within both the first amount of memory and the second amount of memory;
    none of the first amount of memory is stored in the first data structure;
    the first data structure and the second data structure are the same particular type of data structure;
    the particular amount of memory is in the block of memory;
    the first data structure does not contain a pointer to the block of memory, such that the first data structure is only indirectly associated with the block of memory by virtue of the reference to the second data structure.

3. The method of claim 2, wherein:
    each data structure of the particular type maintains a value indicating an amount of memory represented by the data structure; and
    said amount is based, at least in part, on the memory that said each data structure points to directly, or indirectly through one or more other data structures of the particular type that said each data structure references.

4. The method of claim 2, wherein each data structure of the particular type maintains a reference count that is based, at least in part, on the number of data structures of said particular type that directly reference said each data structure.

5. The method of claim 4, wherein the reference count is further based, at least in part, on the number of processing entities that are using at least a portion of the memory represented by said each data structure.

6. The method of claim 2, wherein the first data structure maintains an offset value that indicates an offset into the second amount of memory that is represented by the second data structure.

7. The method of claim 2, further comprising:
    adding, to the first data structure, a particular reference to a third data structure of the particular type, wherein the third data structure contains at least one of the following: (a) a pointer that points to a second block of memory that is different than the block of memory, or (b) a reference that references a different data structure of the particular type; and
    incrementing the amount of memory represented by the first data structure to reflect that the amount of memory represented by the first data structure includes at least a portion of the memory represented by the third data structure.

8. The method of claim 2, further comprising:
    adding, to the first data structure, a particular pointer to a second block of memory that is different than the block of memory; and
    incrementing the amount of memory represented by the first data structure to reflect that the amount of memory represented by the first data structure includes at least a portion of said second block of memory.

9. The method of claim 2, further comprising:
    determining to add a third amount of memory to the first amount of memory, wherein a third data structure represents the third amount of memory;
    determining that the third amount of memory is contiguous with the last portion of the first amount of memory; and
    adding the third amount of memory to the first data structure by:
        modifying a data length value, maintained by the first data structure, to reflect the addition of the third amount of memory, and
        modifying a different data length value, maintained by a certain data structure of the particular type, to reflect the addition of the third amount of memory to the certain data structure, wherein the certain data structure also represents the last portion of the first amount of memory.

10. The method of claim 2, further comprising:
    generating a third data structure of the particular type that represents a third amount of memory, wherein:
        the third data structure contains a particular reference;
        the third amount of memory spans memory represented by one or more data structures of the particular type; and
        the one or more data structures are referenced by the first data structure; and
    causing the third data structure to directly reference the one or more data structures.

11. The method of claim 2, further comprising generating a third data structure of the particular type, wherein:
    an amount of data is allocated for the third data structure; and
    the third data structure maintains a value that indicates the amount of data in a particular block of memory to which the third data structure will point once the particular block of memory is available.

12. The method of claim 2, further comprising:
  generating a third data structure of the particular type, wherein the third data structure maintains a value that indicates zero as the amount of data represented by the third data structure;
  adding one or more blocks of memory to the third data structure by causing one or more pointers associated with the third data structure to point to said one or more blocks of memory.

13. The method of claim 2, wherein:
  the first data structure initially contained (a) a plurality of generic references each capable of referencing a particular memory source and (b) a special reference;
  a memory source is a block of memory or a data structure of the particular type; and
  the method further comprising:
    appending a plurality of memory sources to the first data structure by causing each generic reference of said plurality of generic references to reference a different memory source of said plurality of memory sources;
    appending an additional memory source to the first data structure by:
      generating a third data structure of the particular type, wherein the third data structure contains at least one generic reference;
      causing said special reference to reference the third data structure; and
      causing said at least one generic reference to reference the additional memory source.

14. The method of claim 1, wherein the reference to the second data structure is contained in the first data structure.

15. A machine-readable storage medium for handling discontiguous blocks of memory, comprising one or more sequences of instructions, which instructions, when executed by one or more processors, cause the one or more processors to perform the steps of:
  passing a first data structure from a first processing entity to a second processing entity, wherein the first data structure represents a first amount of memory; and
  the second processing entity accessing a portion of the first amount of memory by:
    determining that the portion of the first amount of memory is located in memory represented by a second data structure that is of a similar type as the first data structure;
    following a reference to the second data structure;
    determining that the second data structure contains a pointer to a block of memory that comprises the portion; and
    using the pointer to access the portion.

16. The machine-readable storage medium of claim 15, wherein:
  the first data structure contains the reference;
  the second data structure represents a second amount of memory;
  the first amount of memory, represented by the first data structure, overlaps with the second amount of memory, represented by the second data structure, such that a particular amount of memory is entirely contained within both the first amount of memory and the second amount of memory;
  none of the first amount of memory is stored in the first data structure;
  the first data structure and the second data structure are the same particular type of data structure;
  the particular amount of memory is in the block of memory;
  the first data structure does not contain a pointer to the block of memory, such that the first data structure is only indirectly associated with the block of memory by virtue of the reference to the second data structure.

17. The machine-readable storage medium of claim 16, wherein:
  each data structure of the particular type maintains a value indicating an amount of memory represented by the data structure; and
  said amount is based on the memory that said each data structure points to directly, or indirectly through one or more other data structures of the particular type that said each data structure references.

18. The machine-readable storage medium of claim 16, wherein each data structure of the particular type maintains a reference count that is based, at least in part, on the number of data structures of said particular type that directly reference said each data structure.

19. The machine-readable storage medium of claim 18, wherein the reference count is further based, at least in part, on the number of processing entities that are using at least a portion of the memory represented by said each data structure.

20. The machine-readable storage medium of claim 16, wherein the first data structure maintains an offset value that indicates an offset into the second amount of memory that is represented by the second data structure.

21. The machine-readable storage medium of claim 16, wherein said instructions are instructions which, when executed by the one or more processors, further cause the one or more processors to perform the steps of:
  adding, to the first data structure, a particular reference to a third data structure of the particular type, wherein the third data structure contains at least one of the following: (a) a pointer that points to a second block of memory that is different than the block of memory, or (b) a reference that references a different data structure of the particular type; and
  incrementing the amount of memory represented by the first data structure to reflect that the amount of memory represented by the first data structure includes at least a portion of the memory represented by the third data structure.

22. The machine-readable storage medium of claim 16, wherein said instructions are instructions which, when executed by the one or more processors, further cause the one or more processors to perform the steps of:
  adding, to the first data structure, a particular pointer to a second block of memory that is different than the block of memory; and
  incrementing the amount of memory represented by the first data structure to reflect that the amount of memory represented by the first data structure includes at least a portion of said second block of memory.

23. The machine-readable storage medium of claim 16, wherein said instructions are instructions which, when executed by the one or more processors, further cause the one or more processors to perform the steps of:
  determining to add a third amount of memory to the first amount of memory, wherein a third data structure represents the third amount of memory;
  determining that the third amount of memory is contiguous with the last portion of the first amount of memory; and
  adding the third amount of memory to the first data structure by:

modifying a data length value, maintained by the first data structure, to reflect the addition of the third amount of memory, and modifying a different data length value, maintained by a certain data structure of the particular type, to reflect the addition of the third amount of memory to the certain data structure, wherein the certain data structure also represents the last portion of the first amount of memory.

24. The machine-readable storage medium of claim 16, wherein said instructions are instructions which, when executed by the one or more processors, further cause the one or more processors to perform the steps of:

generating a third data structure of the particular type that represents a third amount of memory, wherein:
the third data structure contains a particular reference;
the third amount of memory spans memory represented by one or more data structures of the particular type; and
the one or more data structures are referenced by the first data structure; and causing the third data structure to directly reference the one or more data structures.

25. The machine-readable storage medium of claim 16, wherein:

said instructions are instructions which, when executed by the one or more processors, further cause the one or more processors to perform the step of generating a third data structure of the particular type;
an amount of data is allocated for the third data structure; and
the third data structure maintains a value that indicates the amount of data in a particular block of memory to which the third data structure will point once the particular block of memory is available.

26. The machine-readable storage medium of claim 16, wherein said instructions are instructions which, when executed by the one or more processors, further cause the one or more processors to perform the steps of:

generating a third data structure of the particular type, wherein the third data structure maintains a value that indicates zero as the amount of data represented by the third data structure;
adding one or more blocks of memory to the third data structure by causing one or more pointers associated with the third data structure to point to said one or more blocks of memory.

27. The machine-readable storage medium of claim 16, wherein:

the first data structure initially contained (a) a plurality of generic references each capable of referencing a particular memory source and (b) a special reference;
a memory source is a block of memory or a data structure of the particular type; and
said instructions are instructions which, when executed by the one or more processors, further cause the one or more processors to perform the steps of:
appending a plurality of memory sources to the first data structure by causing each generic reference of said plurality of generic references to reference a different memory source of said plurality of memory sources;
appending an additional memory source to the first data structure by:
generating a third data structure of the particular type, wherein the third data structure contains at least one generic reference;

causing said special reference to reference the third data structure; and
causing said at least one generic reference to reference the additional memory source.

28. The machine readable-storage medium of claim 15, wherein the reference to the second data structure is contained in the first data structure.

29. A system for handling discontiguous blocks of memory, comprising:

one or more processors;
a memory coupled to said one or more processors;
one or more sequences of instructions which, when executed, cause said one or more processors to perform the steps of:
passing a first data structure from a first processing entity to a second processing entity, wherein the first data structure represents a first amount of memory; and
the second processing entity accessing a portion of the first amount of memory by:
determining that the portion of the first amount of memory is located in memory represented by a second data structure that is of a similar type as the first data structure;
following a reference to the second data structure;
determining that the second data structure contains a pointer to a block of memory that comprises the portion; and
using the pointer to access the portion.

30. The system of claim 29, wherein:

the first data structure contains the reference;
the second data structure represents a second amount of memory;
the first amount of memory, represented by the first data structure, overlaps with the second amount of memory, represented by the second data structure, such that a particular amount of memory is entirely contained within both the first amount of memory and the second amount of memory;
none of the first amount of memory is stored in the first data structure;
the first data structure and the second data structure are the same particular type of data structure;
the particular amount of memory is in the block of memory;
the first data structure does not contain a pointer to the block of memory, such that the first data structure is only indirectly associated with the block of memory by virtue of the reference to the second data structure.

31. The system of claim 30, wherein:

each data structure of the particular type maintains a value indicating an amount of memory represented by the data structure; and
said amount is based on the memory that said each data structure points to directly, or indirectly through one or more other data structures of the particular type that said each data structure references.

32. The system of claim 30, wherein each data structure of the particular type maintains a reference count that is based, at least in part, on the number of data structures of said particular type that directly reference said each data structure.

33. The system of claim 32, wherein the reference count is further based, at least in part, on the number of processing entities that are using at least a portion of the memory represented by said each data structure.

34. The system of claim 30, wherein the first data structure maintains an offset value that indicates an offset into the second amount of memory that is represented by the second data structure.

35. The system of claim 30, wherein said instructions are instructions which, when executed by the one or more processors, further cause the one or more processors to perform the steps of:
adding, to the first data structure, a particular reference to a third data structure of the particular type, wherein the third data structure contains at least one of the following: (a) a pointer that points to a second block of memory that is different than the block of memory, or (b) a reference that references a different data structure of the particular type; and
incrementing the amount of memory represented by the first data structure to reflect that the amount of memory represented by the first data structure includes at least a portion of the memory represented by the third data structure.

36. The system of claim 30, wherein said instructions are instructions which, when executed by the one or more processors, further cause the one or more processors to perform the steps of:
adding, to the first data structure, a particular pointer to a second block of memory that is different than the block of memory; and
incrementing the amount of memory represented by the first data structure to reflect that the amount of memory represented by the first data structure includes at least a portion of said second block of memory.

37. The system of claim 30, wherein said instructions are instructions which, when executed by the one or more processors, further cause the one or more processors to perform the steps of:
determining to add a third amount of memory to the first amount of memory, wherein a third data structure represents the third amount of memory;
determining that the third amount of memory is contiguous with the last portion of the first amount of memory; and
adding the third amount of memory to the first data structure by:
modifying a data length value, maintained by the first data structure, to reflect the addition of the third amount of memory, and
modifying a different data length value, maintained by a certain data structure of the particular type, to reflect the addition of the third amount of memory to the certain data structure, wherein the certain data structure also represents the last portion of the first amount of memory.

38. The system of claim 30, wherein said instructions are instructions which, when executed by the one or more processors, further cause the one or more processors to perform the steps of:
generating a third data structure of the particular type that represents a third amount of memory, wherein:
the third data structure contains a particular reference;
the third amount of memory spans memory represented by one or more data structures of the particular type; and
the one or more data structures are referenced by the first data structure; and
causing the third data structure to directly reference the one or more data structures.

39. The system of claim 30, wherein:
said instructions are instructions which, when executed by the one or more processors, further cause the one or more processors to perform the step of generating a third data structure of the particular type;
an amount of data is allocated for the third data structure; and
the third data structure maintains a value that indicates the amount of data in a particular block of memory to which the third data structure will point once the particular block of memory is available.

40. The system of claim 30, wherein said instructions are instructions which, when executed by the one or more processors, further cause the one or more processors to perform the steps of:
generating a third data structure of the particular type, wherein the third data structure maintains a value that indicates zero as the amount of data represented by the third data structure;
adding one or more blocks of memory to the third data structure by causing one or more pointers associated with the third data structure to point to said one or more blocks of memory.

41. The system of claim 30, wherein:
the first data structure initially contained (a) a plurality of generic references each capable of referencing a particular memory source and (b) a special reference;
a memory source is a block of memory or a data structure of the particular type; and
said instructions are instructions which, when executed by the one or more processors, further cause the one or more processors to perform the steps of:
appending a plurality of memory sources to the first data structure by causing each generic reference of said plurality of generic references to reference a different memory source of said plurality of memory sources;
appending an additional memory source to the first data structure by:
generating a third data structure of the particular type, wherein the third data structure contains at least one generic reference;
causing said special reference to reference the third data structure; and
causing said at least one generic reference to reference the additional memory source.

42. The apparatus of claim 29, wherein the reference to the second data structure is contained in the first data structure.

* * * * *

UNITED STATES PATENT AND TRADEMARK OFFICE
CERTIFICATE OF CORRECTION

| | | |
|---|---|---|
| PATENT NO. | : 7,793,055 B2 | Page 1 of 1 |
| APPLICATION NO. | : 11/499040 | |
| DATED | : September 7, 2010 | |
| INVENTOR(S) | : Alexander B. Beaman | |

It is certified that error appears in the above-identified patent and that said Letters Patent is hereby corrected as shown below:

In column 18, line 64, delete "(void*refcon," and insert -- (void *refCon, --, therefor.

In column 22, line 4, delete "datasize," and insert -- dataSize, --, therefor.

In column 25, line 49, delete "empty," and insert -- empty. --, therefor.

In column 32, line 30, delete "kFigBlockBufiferBadPointerParameterErr" and insert -- kFigBlockBufferBadPointerParameterErr --, therefor.

Signed and Sealed this
Twenty-ninth Day of November, 2011

David J. Kappos
*Director of the United States Patent and Trademark Office*